US007107048B2

(12) United States Patent
Chandler

(10) Patent No.: US 7,107,048 B2
(45) Date of Patent: Sep. 12, 2006

(54) INVERSION-CONFORMING DATA SETS PROCESSING

(76) Inventor: Larry S. Chandler, 1738 Anderson Rd., Falls Church, VA (US) 22043

( * ) Notice: Subject to any disclaimer, the term of this patent is extended or adjusted under 35 U.S.C. 154(b) by 571 days.

(21) Appl. No.: 10/347,279

(22) Filed: Jan. 21, 2003

(65) Prior Publication Data

US 2003/0212528 A1 Nov. 13, 2003

Related U.S. Application Data

(60) Provisional application No. 60/350,894, filed on Jan. 25, 2002.

(51) Int. Cl.
*H04Q 7/20* (2006.01)

(52) U.S. Cl. .................. 455/423; 702/127; 702/173; 702/179; 702/198; 714/100; 714/48; 714/746; 714/799

(58) Field of Classification Search .............. 455/423, 455/67.1, 67.11, 67.13, 67.16; 714/100, 25, 714/47–48, 746, 799; 702/86, 109, 124–126, 702/127, 173, 179, 198
See application file for complete search history.

(56) References Cited

U.S. PATENT DOCUMENTS

| | | | |
|---|---|---|---|
| 4,709,234 A | 11/1987 | Forehand et al. | |
| 4,889,132 A | 12/1989 | Hutcheson et al. | |
| 4,920,489 A | 4/1990 | Hubelbank et al. | |
| 5,263,486 A | 11/1993 | Jeffreys | |
| 5,475,628 A | 12/1995 | Adams et al. | |
| 5,568,400 A | 10/1996 | Stark et al. | |
| 5,619,432 A | 4/1997 | Chandler | |
| 5,652,713 A | 7/1997 | Chandler | |
| 5,884,245 A | 3/1999 | Chandler | |
| 6,181,976 B1 | 1/2001 | Chandler | |
| 6,226,408 B1 * | 5/2001 | Sirosh ................. 382/224 | |
| 6,684,250 B1 * | 1/2004 | Anderson et al. ......... 709/225 | |

OTHER PUBLICATIONS

B. Cameron Reed, "Linear least–squares fits with errors in both coordinates. II. Comments on parameter variances" Am. J. Phys. vol. 60., No. 1, Jan. 1992, pp. 59–62.

A. Picot, "Pocket calculator program for least–square fitting of data with variable precision" Am. J. Phys. vol. 48, No. 4, Apr. 1980, pp. 302–303.

B. Cameron Reed, "Linear least–squares fits with errors in both coordinates" Am. J. Phys. vol. 57, No. 7, Jul. 1989, pp. 642–646.

J. S. Bendat, "Modern Methods for Random Data Analysis" Measurement Analysis Corporation, A Digitek Company, Mariana del Rey, CA.

J. Ross MacDonald, et al., "Least–squares fitting when both variables contain errors: Pitfalls and possibilities" Am. J. Phys. vol. 60, No. 1, Jan. 1992, pp. 66–72.

(Continued)

*Primary Examiner*—Binh Tieu
(74) *Attorney, Agent, or Firm*—Crowell & Moring LLP

(57) ABSTRACT

In lieu of the common practice of attempting to maximize the likelihood of sample deviations from unknown true values, representations of data inversions are generated by implementing optimizing techniques which are based upon a concept of maximizing the likelihood of deviations of successively determined inversion-conforming data sets from previously acquired (hence invarient) data- point samples. Inversion-conforming data sets are considered to be sets of coordinate points which correspond to the projection of respective data points along corresponding coordinates onto a fitting approximation or onto the locus of any respectively rendered approximating relationship which corresponds to a data inversion or a considered estimate of the same.

23 Claims, 10 Drawing Sheets

DATA-POINT PROJECTIONS AND RESPECTIVE INVERSION-CONFORMING DATA SETS

OTHER PUBLICATIONS

Matthew Lybanon, "A better least–squares method when both variables have uncertainties" Am J. Phys. vol. 52, No. 1, Jan. 1984, pp. 22–26.

William H. Jefferys, "On the Method of Least Squares. II"The Astronomical Journal, vol. 86, No. 1, Jan. 1981, pp. 149–155.

William H. Press, et al., "Fitting Straight Line Data with Errors in Both Coordinates" Computers in Physics, vol. 6, No. 3, May/Jun. 1992, pp. 274–276.

David R. Barker, et al., "Simple Method for Fitting Data when Both Variables Have Uncertainties" Am. J. Phys. vol. 42, Mar. 1974, pp. 224–227.

Jay Orear, "Least squares when both variables have uncertainties" Am. J. Phys. vol. 50, No. 10, Oct. 1982, pp. 912–916.

Mary L. Boas, "A remark on principal–value integrals" Am. J. Phys. vol. 52, No. 3, Mar. 1984, pp. 276–278.

J. Ross MacDonald, "Simple method for fitting data when both variables have uncertainties" American Journal of Physics, vol. 43, No. 4, Apr. 1975, pp. 372–374.

Peter Coy, "Shades of Isaac Newton?" LexisNexis Academic, Science & Technology; Mathematics; No. 3452, p. 110.

William J. Thompson, et al, "Correcting parameter bias caused by taking logs of exponential data" Am. J. Phys. vol. 59, No. 9, Sep. 1991, pp. 854–856.

Anthony Tzes, et al., "Adaptive Fuzzy–Control for Flexible–Link Manipulators: a Hybrid Frequency–Time Domain Scheme" IEEE, 1993, pp. 122–126.

Kyriakos Kyriakides, et al., "Adaptive Fuzzy Dominant–Pole Placement Control" IEEE, 1992, pp. 2517–2522.

Ezz I. El–Masry, et al., "Analog VLSI Current Mode Implementation of Artificial Neural Networks" IEEE, 1993, pp. 1275–1278.

Li Bo, et al., "An Inverse–Deviation Threshold Approach in Neural Network Contollers" IEEE International Conference on Intelligent Processing Systems, Oct. 28–31, 1997.

George Nagy, "Neural Networks–Then and Now" IEEE Transactions on Neural Networks, vol. 2, No. 2, Mar. 1991.

A. W. Ross, "Regression line analysis" Department of Physics, Apr. 12, 1979.

F. Neri, et al., "Error–affected experimental data analysis: application to fitting procedures" Meas. Science Technology, vol. 1, 1990, pp. 1007–1010.

F. Nerit, et al., "An accurate and straightforward approach to line regression analysis of error–affected experimental data" IOP Publishing, Nov. 21, 1998, pp. 215–217.

Michael D. Escobar, et al., "Computing Bayersian Nonparametric Hierarchical Models" Feb. 4, 1998.

R. A. Fisher, "On the Mathematical Foundations of Theoretical Statistics" www.istor.org, Jan. 1, 2002.

"Least Squares as a Maximum Likelihood Estimator" Chapter 15.

Patrick T. Squire, "Linear least–squares fits with errors in both coordinates" Am. J. Phys. vol. 58, No. 12, Dec. 1990, p. 1209.

McAllister H. Hull, Jr., "Least–Squares Method" Encyclopedia of Science, vol. 9, 1987, pp. 648–649.

William H. Press, et al., "Numerical Recipes" The Art of Scientific Computing, 1986.

L. Scharf, "Total Least Squares" Addison–Wesly, New York, 1991, pp. 495–496.

G. K. Smith, Review of "Exponential Family Nonlinear Models" www.maths.uq.edu.au Sep. 7, 2001.

Derek York, "Lease Squares Fitting of a Straight Line" Geophysics Division, Department of Physics, University of Toronto, Canada, Jan. 21, 1966 pp. 1079–1086.

M. Clutton–Brock, "Likelihood Distributions for Estimating Functions when Both Variables are Subject to Error" Technometrics, vol. 9, No. 2, May 1967, pp. 260–269.

* cited by examiner

INVERSION-CONFORMING DATA SETS PROCESSING

CROSS-REFERENCE TO RELATED APPLICATION

This application claims priority from co-pending U.S. provisional patent application No. 60/350,894 filed Jan. 25, 2002.

REFERENCE TO COMPACT DISK APPENDIX

This disclosure includes computer program listing Appendices A and B, submitted in the form of a compact disk appendix containing respective files APPENDIX A.txt, created May 19, 2003, comprising 114K memory bytes, and APPENDIX B.text, also created May 19, 2003, comprising 47K memory bytes, which are incorporated herein by reference.

STATEMENT OF DISCLOSURE COPYRIGHT

Copyright materials herein presented or included by compact disk appendix may be reproduced for purposes of present invention patent disclosure. Unauthorized reproduction for other purposes is prohibited. Unpublished work ©2003, 2002 L. S. Chandler

BACKGROUND OF THE INVENTION

The present invention relates to automated forms of data, processing, more particularly implementing data inversions as related to orthogonal coordinate-oriented data-point projections and respective inversion-conforming data sets.

In accordance with the present invention, a data inversion is considered to be the process or end product of representing data by an approximating relationship such as a fitting function, an approximating equation, a descriptive representation, or any alternately rendered descriptive correspondence. Evaluated parameters which uniquely establish said approximating relationship are herein considered to be fitting parameters, but may be alternately referred to as inversion parameters as related to a respective data inversion.

In accordance with the present invention, inversion-conforming data sets are considered to be approximation-conforming data sets which correspond to the projection of acquired data points (e.g., coordinates, counts, measurements, or alternately acquired data-point defining sets) along corresponding coordinates onto the locus or alternate confines of an approximating relationship, said approximating relationship being rendered as or in correspondence with a respective data inversion or a considered estimate of the same.

In accordance with the present invention, approximation-conforming data sets comprise coordinates of points that are restricted to the confines (i.e., locus, or confining restraints) of a respective approximating relationship.

Preponderance to render accurate data inversions should:
1. establish methodology to account for errors in the measurements of more than one variable,
2. compensate for measurement bias,
3. render realistic representation of respective coordinate related offsets,
4. include appropriate weighting to compensate for the bias which is introduced by a nonuniformity of slopes corresponding to respective orthogonal variables, and
5. adjust for apparent curvilinear distortions and/or other miscellaneous reduction biases.

Reduction Bias

In accordance with the present invention, curvilinear distortion bias is a form of reduction bias which may be induced by linear displacements being imposed over curved orthogonal coordinates corresponding to a curvilinear system of a considered nonlinear approximative form. Other forms of reduction bias may be related to erroneous representation of approximative form, inappropriate weighting, faulty representation of error distribution functions, and/or alternate misrepresentations. In accordance with the present invention, preliminary and/or spurious inversions which may result from a lack of or faulty representation of error distribution functions, as well as certain other forms of measurement and/or reduction bias, may conceivably be adjusted after data inversion by rendering corrections to considered said data inversions.

Slope Related Bias

In accordance with the present invention, compensation for bias which is related to a nonuniformity in slopes may be rendered for a system of N variables corresponding to each of N pertinent degrees of freedom by normalizing each respectively determined variable $x_n$ on a root of the absolute value of the product of differential changes in the local value of said respectively determined variable taken with respect to each of the other considered variables at respective inversion-corresponding points, or alternately, by normalizing each of said considered variables on consistent proportions of the same said corresponding product of differential change. For example, normalizing on the $N^{th}$ root will render each of the considered variables of respective inversion-conforming data sets with normalized units corresponding to the the $N^{th}$ root of their product, and simultaneously provide for rendering means to generate appropriate weighting of respective data-point projections as related to coupled, individually indistinguishable, error displacement components by establishing unified slopes of equivalent unit proportions which directly relate said error displacement components corresponding to each respective coordinate-related inversion-corresponding point.

In accordance with the present invention, a set of simple slope-handling coefficients, $H_n$, may be rendered in type by Equations 1, $$H_n = \frac{1}{\left|\prod_{\eta=1}^{N} \frac{\partial x_n}{\partial x_\eta}\right|^{\frac{1}{\Psi}}} = \left|\prod_{\eta=1}^{N} \frac{\partial x_\eta}{\partial x_n}\right|^{\frac{1}{\Psi}}. \quad (1)$$

In accordance with the present invention, the root designator $\Psi$ should normally be rendered greater than one and is preferably represented as equivalent to the number of pertinent or simultaneously considered variable degrees of freedom N. In accordance with the present invention, the number of simultaneously considered variable degrees of freedom may sometimes be reduced by implementing multiple inversions of data as considered in correspondence with the order in which measurements were taken. Hence, the number of pertinent degrees of freedom being simultaneously considered during a single or partial inversion need not necessarily correspond to the overall number of degrees of freedom of the entire system.

Offset Bias

Faulty representation of multiple coordinate offsets will generally induce a form of offset bias. Coordinate corresponding offsets which are not explicitly included in representing a respective likelihood estimator, if not negligible, may be indistinguishably linked within said estimator. Hence, accurate inversions may require inclusion of close proximity estimates for each pertinent coordinate corresponding offset.

Measurement Bias

Effects of measurement bias may often be reduced by steps which include systematically calibrating measurement equipment, establishing appropriate measurement distribution functions, and increasing the number of data samples. Unknown bias as related to linear inversions will result in a respective linear translation of coordinates and a corresponding error in offset values. Unknown bias as related to nonlinear inversions may cause faulty evaluations of one or more inversion parameters. Slight variations in bias can result in extreme variations in rendering said inversion parameters. In accordance with the present invention, a variety of approaches may be considered and correspondingly implemented to reduce said effects; e.g.: Measurement bias can be ignored and evaluated as included with a single coordinate offset. It can be evaluated by a first order approximation in correspondence with close proximity offset estimates; or alternately, as disclosed herein, compensation for measurement and offset bias may be considered in correspondence with one or more coordinate axes by parametric removal of measurement bias or parametric removal of combined coordinate offsets and measurement bias from likelihood representations and by respectively establishing said measurement bias or said offsets and measurement bias along with maximum likelihood estimates in conjunction with said removal.

Methodology and Related Concerns

Other concerns related to both error and respective bias compensation involve minifying function deviations, maximizing likelihood, and establishing variability and respective weighting to statistically compensate for either or both direct and antecedent measurement dispersions.

Considering measurement events $x_{\eta k}$ over K samples, in accordance with the present invention, these concerns may be adequately resolved by establishing normalization of data-point projections to include simple slope-handling normalization coefficients with the root designator set to the number of considered variable degrees of freedom, then minimizing the sum of squares of a plurality of normalized said data-point projections to generate preliminary inversions with disregard to data sample variability, and then subsequently rendering adequate dispersion adjustments to correct said preliminary inversions and/or rendering maximum likelihood of normalized said data-point projections, said maximum likelihood being rendered to include:

1. representing the variability in correspondence with data-point projections and respective inversion-conforming data sets (in lieu of representing single component residual displacements as directly related to effective said single component measurement variance);
2. representing the likelihood in correspondence with said data-point projections being normalized by including simple slope-handling coefficients as expressed by Equations 1; or by alternately including dispersion-accommodating slope-handling coefficients $H_{nrk}$ as expressed by Equations 2, $$\mathcal{H}_{nrk} = \frac{1}{\left|\prod_{\eta=1}^{N} \frac{\partial x_n / \sqrt{v_n}}{\partial x_\eta / \sqrt{v_\eta}}\right|_{nrk}^{\frac{1}{\Psi}}} = \left|\prod_{\eta=1}^{N} \frac{\partial x_\eta / \sqrt{v_\eta}}{\partial x_n / \sqrt{v_n}}\right|_{nrk}^{\frac{1}{\Psi}}, \quad (2)$$

which effectively establish coordinate systems with axes normalized on the square root of respective dispersion-accommodating variability $\sqrt{V}$ and by which corresponding data-point projections may be both respectively normalized on said square root of variability and suitably normalized to compensate for function related variations in slope;
3. establishing squared projection displacement (SPD) weighting coefficients which may be assumed to correspond in direct proportion to the ratio of the square of included projection normalizing coefficients divided by respective mean values for normalized variability.
4. adequately representing dispersion coupling by implementing dispersion-accommodating variability V comprising representation of measurement precision as rendered to also include any pertinent dispersion effects caused by errors in antecedent measurements (i.e., prior measurements of orthogonal variables);

Dispersion-Accommodating Variability

At least one form for estimating a dispersion-accommodating variability $V_{nrk}$ about a mean value $\mu_{nrk}$ for the $\eta^{th}$ element of a respective inversion-conforming data set (said inversion-conforming data set corresponding to the $r^{th}$ root of the determined $n^{th}$ variable of the $k^{th}$ set of measurement-coupled samples) may be rendered in accordance with the present invention as the sum of respective bi-coupled dispersion components as exemplified by Equations 3, $$v_{\eta rk} = \sum_{l=1}^{N} \int (\mu_{\eta rk} - x_\eta)^2 P(x_l) dx_l, \quad (3)$$

wherein integrations are taken (or approximated) for $x_l$ over the extremes of the respective variable range as limited to the domain of the approximative contour for values of l between 1 and N, including l=η, but generally excluding integrations over variables whose measurements do not effect the measurement of $x_\eta$. In accordance with the present invention, the sum designator with a superimposed tilde, $\tilde{\Sigma}$, as in Equations 3, is herein assumed to allow for the exclusion of non-considered addends from the sum. Units of the dispersion-accommodating variability as represented by Equations 3, will correspond to those of the square of the respective variable, $x^2_\eta$. Contributions from antecedent measurement dispersions are provided by the addends which correspond to l≠η.

Variability as Distinguished from Variance

The words measurement variance, as considered in accordance with the present invention, are assumed to apply to the estimated (or considered likely) variations of individual measurements (generally represented as the square of the standard deviation of a single variable measurement) without inclusion of antecedent measurement dispersions.

In accordance with the present invention, the word variability is assumed to apply to the estimated (or considered likely) uncertainty, which may be preferably rendered as a form of dispersion accommodating variability to include any assumed pertinent antecedent measurement dispersions.

In accordance with the present invention, a variability which is rendered to include both respective measurement variance and related orthogonal measurement dispersions as considered with or without regard to the order in which the measurements were taken either can be or traditionally has been referred to as an effective variance.

In accordance with the present invention, the terms variance and effective variance are to be applied to variability as directly related (or as assumed to be directly related) to sample acquisition or corresponding coordinate transformations of the same.

Alternately, in accordance with the preferred embodiment of the present invention, for $\eta=n$ the variability in the determined measure, $x_{nrk}$, of the variable $x_n$ may be appropriately rendered as a complement of orthogonal measurement variability, i.e., excluding direct representation of the variability of possibly associated measurements (e.g., $x_{nk}$) of said variable $x_n$, said orthogonal measurement variability being rendered to include only considered pertinent dispersions components which may affect or result from respective orthogonal variable measurements.

That is to say in accordance with the present invention that the variability of a determined dependent variable may be rendered as a function of the lateral variability in the sampling of associated independent variables being subject to the restraints imposed by an approximating relationship.

In accordance with the present invention, the terms variance and effective variance do not apply to the variability of the evaluated measure of a dependent variable whose considered value is determined as a function of one or more independent orthogonal variable measurements.

Inversion-Conforming Data Sets

In accordance with the present invention, inversion-conforming data sets (ICDS) are data sets, each of which comprise at least two elements including:

1. a subset of data-point coordinates comprising at least one sample datum (e.g., sample count, coordinate measurement, or provided sample measure) establishing coordinate representation for at least one variable degree of freedom (e.g., $x_{lk}$ for $l \ne n$), and
2. a respectively determined measure, i.e., an evaluated or parametrically represented solution for at least one other variable, said evaluated or parametrically represented solution being herein referred to as the determined element, the root solution element, or determined variable measure, e.g., $x_{nrk}$, of a respective inversion-conforming data set wherein said at least one other variable (or the determined element variable, e.g., $x_n$) is substantially rendered in correspondence with a data inversion and said at least one sample datum, said data inversion being represented by an approximating relationship, equation, function, or an alternate approximating correspondence.

In accordance with the present invention, one or more orthogonal elements comprising said subset of data-point coordinates together with at least one determined element establish an inversion-conforming data set. The one or more elements comprising said subset of data-point coordinates may be alternately referred to as orthogonal elements. The corresponding variables may be referred to as orthogonal element variables; and the provided measure or respective measurement comprising said orthogonal element(s) may be referred to herein as orthogonal measurement(s).

In accordance with the present invention, a plurality of ICDS may be generated in correspondence with each collected data-point set by:

1. rendering a plurality of determined values (e.g., $x_{nrk}$) including any pertinent root values for each considered variable, said values being rendered as determined functions of provided measure(s) or respective measurement(s) for considered orthogonal elements of the corresponding subsets of data-point coordinates (e.g., $x_{lk}$ for $l \ne n$); and by
2. rendering each of said plurality of ICDS to include one of said determined values along with corresponding said provided measure or respective measurement for each of said the respectively included orthogonal element variables, each of said ICDS subsequently designating respective coordinates of (or of an approximation to) a corresponding inversion-defined point location.

In accordance with the present invention, the process of generating ICDS may be referred to as rendering inversion-conforming data sets, or rendering ICDS. The abbreviation, ICDS, is here implemented for convenience to refer to a plurality of inversion-conforming data sets. In accordance with the present invention, the processing of data in correspondence with a plurality of data-point projections and respective inversion-conforming data sets is referred to as inversion-conforming data sets processing. Also for convenience, said inversion-conforming data sets processing may be alternately referred to herein and in the enclosed figures and appendices as ICDS processing. Note that the coordinates of each said inversion-defined point location as individually represented is herein preferably referred to in singular form without abbreviation as an inversion-conforming data set.

The nrk subscripts, which are included herein on the root solution elements of the ICDS, designate evaluations of respective root solutions being rendered as functions of orthogonal measurements of said ICDS. In accordance with the present invention, said root solution elements may be alternately referred to as the root solutions, root elements, or determined elements of respective ICDS. The k subscript designates each of K similarly collected data-point sets, each said data-point set comprising N orthogonal variable measurements or alternately provided measure which specify respective coordinate locations and which exhibit uncertainty-related scatter in correspondence with respective measurement uncertainty. The r subscript distinguishes individual root solutions (e.g., $x_{nrk}$) for establishing each of the respective ICDS (i.e., said r subscript designates each considered root solution for each respectively determined variable $x_n$ of each of the represented ICDS). For alternate applications, the number of roots $R_{nk}$ and respective number of ICDS may vary in correspondence with each represented variable $x_n$ and each data-point set. For certain functions and for various combinations of measurements there may be no real root solutions, while for other functions and respective variables there may be one or more root solutions as considered over the range and domain of the provided data. A data reduction may be limited to representing only real roots or it may be alternately represented to include imaginary or complex roots (e.g., for applications which may involve representing complex variables). Normally imaginary roots which are encountered while evaluating ICDS or while representing dispersions by the integrals of Equations 3 are represented by zero (off contour) probabilities of points not within the realm of current successive approximation, and thus need not be included in generating respective inversions nor in generating respective values for dispersion-accommodating variability.

The Probability Density Function

In accordance with the present invention, for an assumed normal distribution of measurements of $x_l$ over the entirety of possible measurements, the probability density functions $P(x_l)$ as considered in correspondence with the mean values $\mu_{lrk}$ may be rendered as exemplified by Equations 4, $$P(x_l) = \frac{1}{\sigma_{lrk}\sqrt{2\pi}} e^{-\frac{(\mu_{lrk}-x_l)^2}{2(\sigma_{lrk})^2}}, \quad (4)$$

wherein the $\mu_{lrk}$ represent actual or successive estimates of mean values for the considered likely variable measurements.

In accordance with the present invention, said mean values $\mu_{nrk}$ may be approximately rendered by corresponding elements of respective ICDS, i.e., determined values for root solution elements of respective ICDS being conversely considered to represent said mean values, e.g., $$(x_{1k}, \ldots, x_{n-1k}, x_{nrk}, x_{n+1k}, \ldots, x_{Nk}) => (\mu_{1rk}, \ldots, \mu_{nrk}, \ldots, \mu_{Nrk}) \quad (5)$$

With this assumption the integrands, which include $x_l$ and the respective $x_n$, along with each of the included integrals and functions of Equations 3, may be digitally or alternately evaluated in correspondence with displacements around said respective ICDS or successive estimates of the same. In recognition of the fact that not all probability distributions are Gaussian, appropriate renditions of variability may characteristically require establishing respective probability distribution descriptions.

Estimating Derivatives Normalized on Variability

In accordance with the present invention, derivatives of the normalized variables as included in Equations 2 may be alternately approximated by Equations 6, $$\frac{\partial x_\eta / \sqrt{v_\eta}}{\partial x_n / \sqrt{v_n}} = \frac{\partial x_\eta}{\partial x_n} \frac{\sqrt{v_\eta}\left(1 - \frac{x_\eta}{\sqrt{v_\eta}} \frac{\partial \sqrt{v_\eta}}{\partial x_\eta}\right)}{\sqrt{v_n}\left(1 - \frac{x_n}{\sqrt{v_n}} \frac{\partial \sqrt{v_n}}{\partial x_n}\right)} \quad (6)$$

$$\approx \frac{\partial x_\eta}{\partial x_n} \frac{\sqrt{v_\eta}\left(1 - \frac{x_\eta}{\sqrt{v_\eta}} \frac{\Delta \sqrt{v_\eta}}{\Delta x_\eta}\right)}{\sqrt{v_n}\left(1 - \frac{x_n}{\sqrt{v_n}} \frac{\Delta \sqrt{v_n}}{\Delta x_n}\right)},$$

or alternately, in accordance with the present invention, function descriptions and corresponding derivatives may possibly be rendered in terms of modified variables, which are defined with included normalization to provide homogeneous representations of considered variability throughout the range and domain of the respective said modified variables.

Mean Normalized Variability

In accordance with the present invention, mean values for a normalized dispersion-accommodating variability $<N^2(x-x)^2>$ may be defined in terms of projection normalizing coefficients $N_{nrk}$ as considered in the limit as the number of random measurement samples which correspond to the approximative contour is made to approach infinity.

In accordance with the present invention, said mean values may be approximately expressed and correspondingly generated in correspondence with Equation 7, $$<N^2(\mathbf{x}-x)^2> \approx \frac{1}{\sum_k \sum_n \sum_r 1} \sum_{k=1}^{K} \sum_{n=1}^{N} \sum_{r=1}^{R_{nk}} N_{nrk}^2 v_{nrk}. \quad (7)$$

Addends of Equation 7 that do not satisfy expected deviation requirements and/or do not reflect roots that correspond with the considered approximative contour may be alternately excluded. In accordance with the present invention, the value of the subscripted $R_{nr}$ as included in Equation 7 should respectively reflect the number of root solutions which are included in the corresponding sum. Single, appropriately selected roots which may be assumed to correspond to respectively included datum measurements are preferred. For applications in which multiple inversions may be implemented, error deviation variability should be respectively rendered and correspondingly represented in correspondence with each respective inversion.

Projection Normalizing Coefficients

In the past, normalizing of single component displacements has been rendered by a variety of respective measurement related expressions, including: the inverse of standard deviations $1/\sigma$, the square root of the inverse of considered measurement variance $1/\sqrt{v}$, and the square root of the inverse of a considered effective variance (i.e., $1/\sqrt{v_\phi}$).

Projection normalizing coefficients N being considered in accordance with the present invention may include any considered normalizing expressions being implemented to provide normalizing of data-point projections in rendering forms of ICDS processing in correspondence with one or more variable degrees of freedom.

In accordance with the present invention, said normalizing expressions may be extended to represent or include the square root of the inverse of associated dispersion-accommodating variability $1\sqrt{V}$; and considering the ramifications of slope handling, in accordance with the present invention, said normalizing expressions may be alternately rendered to represent or include: simple or dispersion-accommodating slope-handling coefficients, H or H, slope-handling coefficients divided by respective deviations $H/\sigma$ or $H/\sigma$, slope-handling coefficients divided by the square root of respective dispersion-accommodating variability $H/\sqrt{V}$ or $H/\sqrt{V}$, or divided by the square root of respective variance or effective variance $H/\sqrt{v}$, $H/\sqrt{v}$, $H/\sqrt{v_\phi}$, or $H/\sqrt{v_\phi}$.

Also, in accordance with the present invention, said projection normalizing coefficients may be represented as functions of estimated variations in considered parametric representations as related to respective variations in pertinent orthogonal measurements, e.g., $1/_c\sigma$, $1/\sqrt{y}$, $1/\sqrt{y_\phi}$, $1/\sqrt{y}$.

Pre-subscripts c are herein included to specify rendition as a function of at least some form of orthogonal component variability.

In accordance with the preferred embodiments of the present invention, said projection normalizing coefficients may be most aptly rendered in correspondence with the following two applications:

1. said projection normalizing coefficients may be represented as simple slope-handling coefficients to exclude all representation of variability while establishing preliminary inversions for subsequent dispersion correction adjustments; and 2. they may be represented for maximum likelihood evaluations as rendered to include both variations in pertinent orthogonal measurements and direct proportion to respective slope-handling coefficients, e.g., H, $H/_c\sigma$, $H/_c\sigma$, $H/\sqrt{y}$, $H/\sqrt{y}$, $H/\sqrt{y}$, $H/\sqrt{y_\phi}$, $H/\sqrt{y}$, or $H/\sqrt{y_\phi}$. Each form of said normalizing expressions may have merits which are more compatible with particular assumptions or with a particular form of application. Involved rendering of ideal dispersion accommodating coefficients, may not be necessary.

SPD Weighting Coefficients

SPD weighting coefficients, i.e., squared projection displacement weighting coefficients, W, can now be rendered in accordance with the preferred embodiment of the present invention as proportional to the square of a projection normalizing coefficient divided by mean values for normalized dispersion-accommodating variability, $$W_{nrk} \propto \frac{\mathcal{N}_{nk}^2}{<\mathcal{N}^2(\mathbf{x}-x)^2>}. \tag{8}$$

Subscripts missing from the denominator of Equations 8 denote the mean, $<\mathcal{N}^2(\mathbf{x}-x)^2>$, being rendered over all considered possible ICDS root solutions corresponding to each considered degree of freedom over the extremes of the respective variable range as limited to the entire domain of the approximative contour.

In accordance with the present invention, factors of weighting coefficients that can be considered to be constant for all included coordinate representations over the entire ensemble of variable measurements need not be included in said weighting coefficients for rendering respective weighting.

For example, when preferred single root solutions are provided over the entire realm of approximative correspondence, the r subscript can be dropped, and said SPD weighting coefficients may be alternately rendered as approximately proportional to the square of projection normalizing coefficients divided by the sum of the normalized coordinate corresponding dispersion-accommodating variabilities, $$W_{nrk} \propto \frac{\mathcal{N}_{nk}^2}{<\mathcal{N}^2(\mathbf{x}-x)^2>} \leadsto \frac{\mathcal{N}_{nk}^2}{\sum_{k=1}^{K}\sum_{n=1}^{N}\mathcal{N}_{nk}^2 V_{nk}}. \tag{9}$$

The included leadsto sign $\leadsto$ is herein assumed to infer one of a plurality of alternately represented forms.

Alternately, mean values for the normalized dispersion-accommodating variability may generally be considered as constant and consequently omitted from Equations 8 to form Equations 10.

$$W_{nrk} \propto \frac{\mathcal{N}_{nk}^2}{<\mathcal{N}^2(\mathbf{x}-x)^2>} \leadsto \mathcal{N}_{nk}^2 \tag{10}$$

In accordance with Equations 10, by recognizing the mean values for the normalized dispersion-accommodating variability as constant, and by rendering projection normalizing coefficients as assumed to be independent of considered variance, respective SPD weighting coefficients may be rendered as equivalent to or directly proportional to simple slope-handling coefficients, thus providing a convenient weighting for rendering both preliminary and reasonably accurate data inversions without consideration of measurement uncertainty. (In accordance with the present invention, both proportional quantities and equivalent quantities are considered to be proportional.)

The subscript notation nrk has herein been adopted to imply evaluation with respect to ICDS, each of said ICDS including a respective root location being determined as a function of at least one orthogonal inversion-conforming data set element; each of said ICDS (e.g., $x_{1k}, \ldots, x_{n-1k}, x_{nrk}, x_{n+1k}, \ldots, x_{Nk}$) comprising determined measure of said respective root location, $x_{nrk}$ and a subset of a respective data-point set (e.g., $x_{1k}, \ldots, x_{n-1}, x_{n+1k}, \ldots, x_{Nk}$).

Selecting an Inversion Estimator

The selection of parametric approximative form for representing variability and respective weighting may correspondingly reflect the explicit rendition type for a least-squares or maximum likelihood estimator, or it may reflect a compromise related to execution time or memory allotment without regard to an appropriate formulation of maximum likelihood. Due to the fact that only proportionate weighting is generally required, alternate SPD weighting may (for some applications) indeed provide quite similar results. In accordance with the present invention, corrections to preliminary data inversions can be considered by rendering similar inversion results from successively corrected data representations being combined with characterized dispersions to generate respective data simulations of characteristic form for said rendering; however, in order to account for errors in more than a single variable while representing maximum likelihood, individual coordinate corresponding weighting should be considered with respect to each included error deviation and said weighting may need to include dispersion effects of related, prominently coupled antecedent measurements.

For considering linear approximations, or for considering data inversions over regions of negligible or small curvature (said curvature being considered as negligible over a range corresponding in length to the respective data-point projections), in accordance with the present invention, by assuming normal homogeneous error distribution functions, with the root designator $\Psi$ set equal or nearly equal to N, a simple dispersion-accommodating variability may be expressed by Equations 11.

$$V_\eta \leadsto \sum_{l=1}^{N} \left(\sigma_l \frac{\partial x_\eta}{\partial x_l}\right)^2. \tag{11}$$

In accordance with the present invention, Equations 11 establish the following provisions:
1. the rendered variability $V_\eta$ may represent any or each of N coordinate-oriented measurement dispersion; and
2. orthogonal components for l between 1 and N that are not considered to contribute to dispersions in the measurement of $x_\eta$ need not be included.

In accordance with the present invention, the sum designator with a superimposed tilde, $\tilde{\Sigma}$, as included in Equations 11, is assumed to imply exclusion of components that are not considered to contribute to dispersions in the measurement of $x_\eta$. For example, one might measure a first variable from an absolute reference frame, hence the variability of the first variable measurement would be equal to its respective measurement variance. It then might be necessary to measure a second variable from the location of the first variable measurement. The second variable measurement would correspondingly reflect its associated measurement variance plus the dispersion caused by error in establishing the location of the first variable. A third variable measurement could include dispersions of both the first and the second variable measurements. Thus the order of measurements may be viewed as a factor in determining the overall variability of each respective measurement.

The Complement of Orthogonal Measurement Variability

In accordance with the present invention, collected measurements (e.g., $x_{nk}$) may be considered to be constant in value. That is to say, once a measurement has been established and recorded, so long as record containing the measurement is not altered and the memory containing the record remains reliable, the measurement will remain invariant regardless of its accuracy. Hence, in accordance with the preferred embodiment of the present invention, the variability (e.g., $V_{nrk}$) of data-point projections (whether said projections are correspondingly oriented or oppositely directed, e.g., $x_{nk}-x_{nrk}$ or $x_{nrk}-x_{nk}$) may be considered equivalent to the parametrically determined variability of the root solution elements (e.g., $x_{nrk}$) of respective ICDS as related to the inherent uncertainty in the sampling of respective orthogonal elements being restricted to the confines of a respective approximating relationship.

Although measurement variability corresponding to respective root element designated locations might be spuriously rendered as a variability which would correspond to sampling measurements of $x_n$ at root element designated locations $x_{nrk}$, or by respective proportions, innovations, or approximations of the same, in accordance with the preferred embodiment of the present invention, the variability of actual root solution elements are more aptly rendered as related to complements of orthogonal measurement variability, which are functions of the variability of the orthogonal elements of said respective ICDS. In accordance with the preferred embodiment of the present invention, said complements of orthogonal measurement variability may be rendered as the sum of orthogonal bi-coupled variability dispersion components as exemplified by Equations 12, $$_cV_{nrk} = -\int (\mu_{nrk} - x_n)^2 \mathcal{P}(x_n) dx_n + \sum_{l=1}^{N} \int (\mu_{nrk} - x_n)^2 \mathcal{P}(x_l) dx_l; \quad (12)$$

or by alternate renditions, innovations, or approximations of the same.

In accordance with the present invention, the variability-related probability density functions $P(x_l)$ of the variables $x_l$, and the respective probability density functions $P(x_n)$ of the variables $x_n$, as related to the considered mean values, may be estimated in correspondence with an appropriately selected probability distribution by replacing the included measurement variance, e.g., $\sigma_{lrk}^2$ or $\sigma_{nrk}^2$, with respective dispersion-accommodating variability, e.g., $V_{lrk}$ or $V_{nrk}$.

In accordance with the present invention, for assumed normal distributions of data-point projections over the entirety of possible orthogonal measurements (e.g. for linear applications and normal distributions of respective deviation components) the variability-related probability density functions $P(x_l)$ as considered in correspondence with the mean values $\mu_{lrk}$ may be estimated as exemplified by Equations 13, $$\mathcal{P}(x_l) \sim \frac{1}{\sqrt{2\pi v_{lrk}}} e^{-\frac{(\mu_{lrk}-x_l)^2}{2v_{lrk}}}, \quad (13)$$

however, distributions of variable measurements as related to nonlinear functions when rendered to include significant antecedent measurement dispersions are not generally expected to be truly Gaussian.

In accordance with the present invention, for assumed Gaussian distributions and statistically independent measurements, complements of dispersion-accommodating variability may be alternately approximated as the complements of the respective mean squared deviations, e.g., $$_cV_{nrk} \sim {_c\sigma_{nrk}^2} = -\int (\mu_{nrk} - x_n)^2 P(x_n) dx_n + \sum_{l=1}^{N} \int (\mu_{nrk} - x_n)^2 P(x_l) dx_l \sim \left[ -\sigma_n^2 + \sum_{\eta=1}^{N} \left( \sigma_\eta \frac{\partial x_n}{\partial x_\eta} \right)^2 \right]_{nrk}. \quad (14)$$

In accordance with the preferred embodiment of the present invention, complements of orthogonal measurement variability may be implemented to characterize the uncertainty of adjustment dependent root elements of the ICDS and to correspondingly establish the variability of respectively determined data-point projections as functions of related inversion parameters or successive estimates of the same.

Rendering Complementary Weighting Coefficients

In accordance with the present invention, SPD weighting coefficients may be correspondingly rendered and alternately implemented in complementary form as complementary weighting coefficients. Complementary weighting coefficients $_cW_{nrk}$ are here defined as weighting coefficients in which the variability of determined variable measure is rendered as a complement of orthogonal measurement variability. For example, considering statistically independent data-point component sampling, respective variability as expressed by Equations 11 may be rendered as the complement of respectively orthogonal mean squared deviations by omitting the addends which correspond to the subscript l=n as in Equations 14.

By assuming projection normalizing coefficients in correspondence with statistically independent measurements of homogeneous precision, respective mean values for the complement of normalized variability as approximated by Equations 7 may be alternately expressed in correspondence with the sum of normalized complements of respectively normalized mean squared deviations as by Equation 15.

$$<\mathcal{N}^2(X-x)^2> \sim \sum_{k=1}^{K}\sum_{n=1}^{N}\sum_{r=1}^{R_{nk}} \frac{\mathcal{N}_{nrk}^2 {_c\sigma_{nrk}^2}}{\sum_k \sum_\eta \sum_r 1}. \quad (15)$$

By considering Equations 14 and combining Equations 8, and 15, the respective complementary weighting coefficients can be approximated by Equations 16, $$\mathcal{W}_{nrk} \sim {_c\mathcal{W}_{nrk}} \sim N_{nrk}^2 \Bigg/ \sum_{k=1}^{K}\sum_{n=1}^{N}\sum_{r=1}^{R_{nk}} \frac{\mathcal{N}_{nrk}^2 {_c\sigma_{nrk}^2}}{\sum_k \sum_\eta \sum_r 1}. \quad (16)$$

wherein the included variances corresponding to respective sampling of root element variable measurements are replaced by complements of the respectively included orthogonal measurement variance. Applications of Equations 16 would normally include projection normalizing coefficients which are inversely proportional to the variability of the parametrically determined variable measure of the respective ICDS being rendered as complements of independent orthogonal measurement variance. The resulting weighting coefficients being rendered in correspondence with Equations 16 would substantially represent inverse proportion to the estimated variability of said parametrically determined variable measure as related to statistically independent data-point component sampling.

A somewhat more general weighing approximation may be rendered in accordance with the present invention, by alternately considering Equation 7 and 8 with Equations 12 and 13, and rendering the respective complementary weighting coefficients as a function of orthogonal element dispersion accommodating variability, as exemplified by the Equations 17.

$$W_{nrk} \rightsquigarrow {}_cW_{nrk} \rightsquigarrow \mathcal{N}_{nrk}^2 \bigg/ \sum_{k=1}^{K} \sum_{n=1}^{N} \sum_{r=1}^{R_{nk}} \frac{\mathcal{N}_{nrk}^2 \, {}_c\mathcal{V}_{\eta rk}}{\sum_k \sum_\eta \sum_r 1}. \quad (17)$$

Applications of Equations 17 might include representing the projection normalizing coefficients in proportion to the square of respective slope handling coefficients and inversely proportional to the estimated variability of said parametrically determined variable measure.

For another example, by assuming constant representation for the mean normalized variability, and assuming a projection normalizing coefficient which may be be considered inversely related to measurement variability at the root element location, the respective complementary weighting coefficients may be generated by considering Equations 8 in correspondence with the ratio of variability proportions as expressed by the approximation of Equations 18.

$$W_{nrk} \rightsquigarrow {}_cW_{nrk} \rightsquigarrow \mathcal{N}_{nrk}^2 \frac{\mathcal{V}_{nrk}}{{}_c\mathcal{V}_{nrk}}. \quad (18)$$

Applications of Equations 18 would provide for representing the projection normalizing coefficients to include normalization on variability by forms including $H_{nrk}/V_{nrk}$, $H_{nrk}/V_{nrk}$, and $1/V_{nrk}$, wherein the included variability may be rendered as variance, as dispersion-accommodating variability, or an alternately considered form for representing effective variance.

In accordance with the present invention, complementary weighting coefficients being generated as the inverse of a complement of effective variance $v_{\Phi k}$ might be rendered as exemplified by Equations 19.

$$W_{\Phi k} \rightsquigarrow {}_cW_{nrk} \rightsquigarrow \frac{1}{{}_cV_{\Phi k}} = \frac{1}{2\,{}_c\sigma_{\Phi k}^2} \quad (19)$$

$$= \frac{1}{2\left[-\sigma_{\Phi k}^2 + \sum_{\eta=1}^{N}\left(\sigma_\eta \frac{\partial \phi}{\partial x_\eta}\right)^2\right]_{nk}}.$$

In accordance with the present invention, complementary weighting coefficients can be generated in correspondence with any normalization which is considered to include the variance or alternately represented sample variability by replacing said variance or alternately represented sample variability by a complement of orthogonal measurement variability or alternately rendering said complementary weighting coefficient as being substantially related in inverse proportion to the estimated variability of the parametrically determined variable measure of a respective inversion-conforming data set.

Representing Measurement Precision

Unfortunately, the collecting of information on the precision of measurements is often neglected, and respective estimates may need to be based upon the scatter in the collected data samples, or a relative or approximate "guess". Past efforts to establish uncertainty in measurement precision has been generally limited to establishing standard deviations of considered statistically independent variable measurements, while at times, intentionally or unavoidably including multivariate dispersions in representing said variable measurements. (In accordance with the present invention, the word multivariate is assumed to imply more than one variable.)

In accordance with the present invention, the coordinate-related precision estimates as herein designated by the symbol σ preferably represent point wise standard deviations or alternate estimates for representing displacements as related to isolated single variable measurement precision which are not related to antecedent measurement dispersions.

In accordance with the present invention, for homogeneous precision the independently considered coordinate-related precision estimates are assumed to be constant over respective measurements corresponding to the represented values of a respective single variable.

Thus, for uniform nonsked error distributions in the measurement of the respective orthogonal variables $x_j$, the relative measurement-related precision estimates $\sigma_{ljk}$ of respective coordinate sample measurements $x_{jk}$ are assumed to be constant for all respective ICDS.

In accordance with the present invention, for heterogeneous precision, the measurement-related precision estimates may be correspondingly represented as empirical or analytical functions of respective coordinate locations.

In addition to considered homogeneous or heterogeneous precision, for applications which involve errors in the measure of more than one variable, a spurious bias in measurement will generally be imposed when attempting to measure or evaluate a variable with respect to an error-affected antecedent measurement. In order to represent variability by Equations 3 or alternate renditions there of, estimates of the included measurement precision (e.g., $\sigma_{nrk}$) should presumably reflect measurement techniques as might be related to single, statistically independent variable measurements. Effort should be made to establish considered measurement precision as related to measurement techniques which can be considered uncontaminated by related orthogonal measurement dispersions. Recognizing that the considered estimates of uncertainty may necessarily include effects from related orthogonal measurement dispersions, an alternate approach might be to represent actual variability by originally assumed or estimated values. In accordance with the present invention, the measurement scatter and associated bias caused by effects of related variable measurement error may be referred to as dispersion effects. Said dispersion effects may be assumed to be included or excluded by representing variability as exemplified by respective renditions of Equations 3 through 19 or as alternately rendered by considering the deviations in measurements which directly reflect local multivariate dispersions as related to a specific measurement order.

Representing Maximum Likelihood

Past efforts to establish maximum likelihood in correspondence with errors in the measurement of more than one variable may be characterized as related to single component residual displacements. The terminology single component residual displacement is herein considered to imply variation of a single component datum measurement or a measurement related function from a respective unknown true value and/or a corresponding unknown true coordinate location, with likelihood being defined in correspondence with the variability of said datum measurement or measurement related function as rendered to represent a respective variance or effective variance from said unknown true value and/or said corresponding unknown true coordinate location.

In accordance with the present invention, alternate terminology, that of data-point projection is applied to estimates of the difference between a respective inversion-conforming data set and the corresponding data-point set (or vice versa). In accordance with the present invention, likelihood which is related to data-point projections may be referred to as ICDS likelihood. By representing orthogonal data-point projections which are correspondingly related to respective ICDS, maximum likelihood may be alternately rendered to include multivariate constraints which tend to minify function deviations in correspondence with each coordinate axis, and said maximum likelihood may be simultaneously rendered, in accordance with the present invention, to include both slope handling and related coordinate corresponding variabilities. In accordance with the present invention, a multi-dimensional ICDS likelihood can be expressed by Equation 20, $$L = \prod_{k=1}^{K} \prod_{n=1}^{N} \prod_{r=1}^{R_{nk}} (\mathcal{N}_{nrk} x_{nk} - \mathcal{N}_{nrk} x_{nrk}), \tag{20}$$

comprising products of data-point projection probability density functions $\wp$ wherein the data $x_{nk}$ are assumed to be invariant, and the variability of the normalized data-point projections $N_{nrk}x_{nrk} - N_{nrk}x_{nrk}$ (for $N_{nrk}$ independent of adjustments) can be represented by the variability of the normalized root solution elements $N_{nrk}x_{nrk}$ of respective ICDS.

In accordance with the present invention, the multi-dimensional likelihood probability density function as expressed by Equation 20 may be alternately rendered by a form which includes compensation for extraneous measurement bias which may be indistinguishably associated with respective coordinate offsets, e.g., $$L \rightsquigarrow \prod_{k=1}^{K} \prod_{n=1}^{N} \prod_{r=1}^{R_{nk}} \wp(\mathcal{N}_{nrk} x_{nk} - \mathcal{N}_{nrk} \tilde{o}_n - \mathcal{N}_{nrk} x_{nrk} + \mathcal{N}_{nrk} \tilde{o}_n). \tag{21}$$

In accordance with the present invention, Equation 21 establishes form for a bias-free likelihood estimator, i.e., in said Equation 21 representation for measurement and/or offset bias is subtracted from the data and corresponding root solutions in order to disassociate the respective offsets and measurement bias from the orthogonal data-point projections and thereby establish a respective nonbiased distribution of addends for rendering maximum likelihood. The $\tilde{o}_n$ represent adjustment bias which may parametrically correspond to any one or any combination of coordinate offsets and/or respective coordinate-oriented bias. Unfortunately, the coordinate corresponding offsets and respective measurement bias are indistinguishably linked, and at least for linear applications may only be considered simultaneously for all coordinate axes by the inclusion of additional estimates or estimating restrains. Restraints on or valid estimates of one or more coordinate-related offsets may be useful in attempting to establish valid convergence. Slight variations in estimating a single component of bias may have devastating effects upon respective evaluations of the remaining inversion parameters. For nonlinear applications the problem may be compounded by the rendering of inappropriate probability density functions and by associated curvilinear distortion bias, said curvilinear distortion bias being related to linear error deviations being imposed upon a curvilinear coordinate system. However, adjustments for inappropriate probability density representation and/or included curvilinear distortion bias may be attempted after inversion processing for specifically considered error distribution functions by rendering corrected inversion approximations as suggested earlier in this disclosure.

At least for linear applications a single adjustment bias may be rendered to represent the combined offsets and measurement bias of all of the respective coordinates, said single adjustment bias being generally oriented along the dependent variable coordinate. The remaining, all, or any combination of adjustment bias parameters $\tilde{o}_n$ as included in Equation 21 can often be:

1. omitted along with respective bias estimates;
2. included along with associated defining restraints; or
3. rendered as close proximity coordinate offset estimates with provision for bias being rendered by respective optimizing adjustments or first order variation estimates during inversion processing.

An accent tilde ~ is inscribed over the adjustment bias $\tilde{o}_n$ in Equation 21 to indicate optional inclusion(s).

The bold type $\tilde{o}_n$ with superinscribed tilde are simultaneously included along with the adjustment $\tilde{o}_n$ to represent values or estimates (or successive estimates) of said offsets and measurement bias. The difference $x_{nk} - \tilde{o}_n$ represents each sample measurement of $x_{nk}$ being optionally corrected for both offset and/or related bias, and subsequently being held constant during maximizing or minimizing differentiation.

In accordance with present invention, maximum likelihood may be established by maximizing forms of Equations 20 and 21 with respect to the included adjustment parameters, or by maximizing other devised forms of Likelihood which alternately establish likelihood in correspondence with orthogonal data-point projections as related to respective ICDS.

For example, by:

1. assuming Gaussian distributions to represent the probability density of normalized root solutions $N_{nrk}x_{nrk}$ of respective coordinate determined ICDS about respectively normalized variable measurements $N_{nrk}x_{nk}$; and
2. assuming minified function deviations and appropriately considered measurement error distributions as conversely rendered relative to respective ICDS;

then, for normalized projections $N_{nrk}[x_{nk} - x_{nrk}]$ of the determined said root solutions $x_{nrk}$ from the respective measurements $x_{nk}$ for a set of variables $x_n$ being simultaneously represented over an ensemble of K sample measurements, the N-dimensional bias-corrected ICDS likelihood probability density function L representing the coordinate corresponding plurality of ICDS being respectively considered in correspondence with respectively included orthogonal measurement $x_{1k}, \ldots, x_{n-1k}, x_{n+1k}, \ldots, x_{Nk}$ may be approximated, for example, by Equation 22, $$L \rightsquigarrow \prod_{k=1}^{K} \prod_{n=1}^{N} \prod_{r=1}^{R_{nk}} \wp(\mathcal{N}_{nrk} \mathbf{x}_{nk} - \mathcal{N}_{nrk} \tilde{o}_n - \mathcal{N}_{nrk} x_{nrk} + \mathcal{N}_{nrk} \tilde{o}_n) \tag{22}$$

$$\rightsquigarrow e^E \prod_{k=1}^{K} \prod_{n=1}^{N} \prod_{r=1}^{R_{nk}} \frac{1}{\sqrt{2\pi <\mathcal{N}^2(\mathbf{x}-x)^2>}},$$

wherein the included exponent E may be expressed by Equation 23, $$E = -\sum_{k=1}^{K} \sum_{n=1}^{N} \sum_{r=1}^{R_{nk}} \frac{\mathcal{N}_{nrk}^2 [(x_{nk} - \tilde{o}_n) - x_{nrk} + \tilde{o}_n]^2}{2 < \mathcal{N}^2(x-x)^2 >}, \quad (23)$$

and wherein the ratio of squared projection normalizing coefficients to mean normalized variability may be alternately rendered in direct proportion to an appropriate weighting coefficient. The included tilde which is superimposed upon the r subscripted product designator in Equations 20, 21, and 22, and upon the respective sum designator in Equation 23 is assumed in accordance with the present invention to allow for the exclusion of non-considered ICDS (e.g., ICDS that may not reflect roots that correspond with the considered approximative contour, and/or ICDS that correspond to data that may not satisfy expected deviation requirements).

The projection normalizing coefficients $N_{nrk}$ should be appropriately rendered to establish a respective projection normalization in correspondence with respectively considered data-point projections. For example, implementing slope handling coefficients of $\Psi = N$, will establish same units for all represented data-point projections.

In accordance with the present invention, said projection normalizing coefficients may be alternately rendered to include variance, variability, or complements variance or of variability with considered regard for likelihood; and in accordance with the present invention, said projection normalizing coefficients may be rendered to include slope-handling coefficients or alternate forms of slope compensating. Estimates for mean normalized variability may be omitted, represented in correspondence with Equation 7 (including alternate proportions, approximations, or innovations of the same) or rendered as included in correspondence with respective weighting coefficients. Respective complements of dispersion-accommodating variability may be rendered in correspondence with Equations 12 or alternate renditions, approximations, or innovations of the same.

The actual maximizing of Likelihood may be correspondingly accomplished by any of a variety of means of parameter estimating and/or optimizing which are readily available and which may be alternately implemented. For Example, forms of optimizing and respective parameter estimating which involve maximizing or minimizing may be accomplished by equating partial derivatives to zero, respectively replacing adjustment parameters by approximating parameters (or parametrically represented inversion parameters) and solving the resultant equations.

Setting the derivatives of Equation 23 to zero and replacing the ratio of squared projection normalizing coefficients to mean normalized variability by proportionate SPD weighting will yield a respective set of independent equations as exemplified by Equation 24, $$\sum_{k=1}^{K} \sum_{n=1}^{N} \sum_{r=1}^{R_{nk}} W_{nrk} \left[ (x_{nk} - x_{nrk}) \left( \frac{\partial (x_{nrk} - \tilde{o}_n)}{\partial P_j} \right) \right]_{P_0, \ldots, P_j} = 0, \quad (24)$$

said SPD weighting being configured by rendition in accordance with the present invention to either include or exclude said slope-handling; and said SPD weighting being configured by rendition to either include or exclude dispersion accommodations for representing homogeneous or heterogeneous precision.

One or more bias parameters and/or respective offsets may be alternately included as expressed by Equations 25, $$\sum_{k=1}^{K} \sum_{n=1}^{N} \sum_{r=1}^{R_{nk}} W_{nrk} \left[ (x_{nk} - x_{nrk}) \left( \frac{\partial (x_{nrk} - \tilde{o}_n)}{\partial \tilde{o}_b} \right) \right]_{P_0, \ldots, P_j} = 0, \quad (25)$$

which may be rendered such that $\tilde{o}_b = P_j$ for each instance in which j corresponds to b. The adjustment parameters $P_j$ including any represented bias adjustments $\tilde{o}_b$ may be respectively replaced by determined approximating parameters $P_j$ including $\tilde{o}_b$, in correspondence with the rendition of differentials being equated to zero during minimizing or maximizing operations.

For addends of Equations 25 in which n=b the partial derivative of the quantity $x_{nrk} - \tilde{o}_b$ as expressed in terms of orthogonal measurement, and taken with respect to included $\tilde{o}_b$ will normally vanish. Alternately for addends in which n≠b the derivatives taken with respect to $\tilde{o}_b$ will generally not vanish, thus providing for rendering means, in accordance with the present invention, to isolate and evaluate respective measurement bias and/or respectively considered bias-affected coordinate offsets.

In accordance with the preferred embodiment of the present invention, implementing data inversions in correspondence with ICDS likelihood, as expressed by Equations 20 or 21, or as estimated by Equations 22 and 23, for $\Psi = N$ should appropriately account for errors in more than one variable and compensate for the bias which is introduced by a nonuniformity of slopes corresponding to respective orthogonal variables. And, in accordance with the present invention, implementing data inversions in correspondence with ICDS likelihood as expressed by Equation 21 or as estimated by Equations 22 and 23 as rendered with appropriate offset estimates and bias restraints may also provide for possible isolation of related measurement bias.

Rendering an Example of Maximum Likelihood

Assuming a summation over both k and n for all considered data sets and respectively considered roots; and subsequently rendering a respective solution set for Equations 24 and 25, should establish a respective representation of maximum likelihood and simultaneously minify function deviations in correspondence with the represented ICDS and respective orthogonal data-point projections $x_{nk} - x_{nrk}$.

In accordance with the present invention, alternate methods of solution may be employed. For example, considering the form of Equations 24 and 25, an iterative solution may be obtained by rendering first order Taylor series expansions around successive approximations to the inversion parameters, and correspondingly establishing a set of linear independent equations for evaluating respective corrections. Implementing said Taylor series expansions of the expressions on the left hand side of Equations 24 and 25 and combining the notation of Equation 24 to include Equation 25 will directly yield the set of linear independent Equations 26, $$\sum_{k=1}^{K}\sum_{n=1}^{N}\sum_{r=1}^{R_{nk}}\sum_{\epsilon=0}^{J}\delta P_{\epsilon}\mathcal{W}_{nrk}\left[\frac{\partial x_{nrk}}{\partial P_{\epsilon}}\frac{\partial X_{nrk}}{\partial P_{j}}-(\mathbf{x}_{nk}-x_{nrk})\frac{\partial^{2}X_{nrk}}{\partial P_{\epsilon}\partial P_{j}}\right]_{P_{0},\ldots,P_{j}}=-\sum_{k=1}^{K}\sum_{n=1}^{N}\sum_{r=1}^{R_{nk}}\mathcal{W}_{nrk}\left[(\mathbf{x}_{nk}-x_{nrk})\frac{\partial X_{nrk}}{\partial P_{j}}\right]_{P_{0},\ldots,P_{j}},\tag{26}$$

wherein the $X_{nrk}$ are assumed to represent the determined ICDS root variable measures $x_{nrk}$, being parametrically rendered as functions of orthogonal measurement, and also including parametric correction for any inversion-related offset and/or any considered data-related bias.

The included $\delta P_\epsilon$ represent corrections to estimates for the included inversion parameters. In accordance with this considered example, said corrections may be evaluated in correspondence with said estimates for said inversion parameters and implemented in correcting said estimates in order to establish successive approximations.

A matrix equation may be rendered to evaluate successive corrections to inversion parameters while respectively minifying function deviations, implementing multivariate dispersion coupling, and while rendering maximum likelihood estimates in correspondence with Equations 22 through 26. Exemplary form for the respective matrix equation, may be expressed, for example, by Equation 27, $$\begin{bmatrix} a_{0,0} & \ldots & a_{\epsilon,0} & \ldots & a_{J,0} \\ \ldots & \ldots & \ldots & \ldots & \ldots \\ a_{0,j} & \ldots & a_{\epsilon,j} & \ldots & a_{J,j} \\ \ldots & \ldots & \ldots & \ldots & \ldots \\ a_{0,J} & \ldots & a_{\epsilon,J} & \ldots & a_{J,J} \end{bmatrix} \begin{Bmatrix} \delta P_0 \\ \ldots \\ \delta P_\epsilon \\ \ldots \\ \delta P_J \end{Bmatrix} = \begin{Bmatrix} -\sum_{k=1}^{K}\sum_{n=1}^{N}\sum_{r=1}^{R_{nk}}\mathcal{W}_{nrk}C_{nrk0} \\ \ldots \\ -\sum_{k=1}^{K}\sum_{n=1}^{N}\sum_{r=1}^{R_{nk}}\mathcal{W}_{nrk}C_{nrkj} \\ \ldots \\ -\sum_{k=1}^{K}\sum_{n=1}^{N}\sum_{r=1}^{R_{nk}}\mathcal{W}_{nrk}C_{nrkJ} \end{Bmatrix}, \tag{27}$$

wherein the included elements of the square matrix are correspondingly represented by Equations 28, $$a_{\epsilon,j}=\sum_{k=1}^{K}\sum_{n=1}^{N}\sum_{r=1}^{R_{nk}}\sum_{\epsilon=0}^{J}\mathcal{W}_{nrk}\left[\frac{\partial x_{nrk}}{\partial P_{\epsilon}}\frac{\partial X_{nrk}}{\partial P_{j}}-(\mathbf{x}_{nk}-x_{nrk})\frac{\partial^{2}X_{nrk}}{\partial P_{\epsilon}\partial P_{j}}\right]_{P_{0},\ldots,P_{J}},\tag{28}$$

and the coefficients $C_{nrkj}$ which are included in the equivalence column matrix may be expressed by Equations 29.

$$C_{nrkj}=\left[(\mathbf{x}_{nk}-x_{nrk})\frac{\partial X_{nrk}}{\partial P_{j}}\right]_{P_{0},\ldots,P_{J}}.\tag{29}$$

Data reductions being rendered in correspondence with ICDS and respective data-point projections, which may be rendered in correspondence with Equations 20 or 21, or in correspondence with the approximations of Equations 23, through 29, and including alternate innovations, renditions, or approximations of the same with or without consideration of bias reflection, should provide for rendering statistically accurate inversions of considered data in accordance with the present invention.

Minifying Function Deviations

Function deviations may be either positive or negative in value. The word minify as used herein implies a reduction in size or magnitude without regard to sign and hence the minifying of function deviations is assumed herein to imply an optimal reduction in the amount of deviation between ICDS root solution elements and respective measurement values whether they be positive or negative. In accordance with the preferred embodiment of the present invention, function deviations may be minified by maximizing likelihood in correspondence with orthogonal data-point projections as related to all pertinent or simultaneously considered degrees of freedom and respective variations of said root solution elements $x_{nrk}$ of the corresponding ICDS.

Consider an ideal descriptive equation in the form of Equation 30, $$Q_0 - P_0 - \sum_{i=1}^{I} P_i Q_i = 0, \tag{30}$$

wherein the $P_0$, as included, is assumed to represent a considered single component offset and a correspondingly linked multiple component measurement bias. The $P_i$ represent the term coefficients. The $Q_0$ may include or represent a dependent variable. The $Q_i$ generally include at least one independent variable representation. At least one independent variable and one dependent variable may be assumed to be represented.

Respective single component inversion deviations $\phi$ may be represented by Equation 31.

$$\phi = Q_0 - P_0 - \sum_{i=1}^{I} P_i Q_i. \tag{31}$$

In accordance with the present invention, represented descriptive equations and respective inversion deviations are not limited to the form expressed by Equations 30 and 31. They may be alternately rendered to represent any form of fitting function or descriptive correspondence between related variables.

Corresponding data-related inversion residuals $\phi(x_{1k}, \ldots, x_{Nk})$ may be generated by evaluating the inversion deviations in correspondence with measured values for all the represented variables. Respective data-related inversion residuals being considered to represent differences between measurements and respective evaluations of a single selected variable or variable-related function, such as $Q_0$ in Equations 30 and 31, with variation being considered from said evaluations to said measurements with variability being established in correspondence with the variance or effective variance in the respective data-point locations are herein considered to represent a form of single component residual displacements.

Alternately, differences between respective evaluations and data-point measurements with variation being considered from said measurements to said evaluations with variability being represented as a function of estimated variations in considered parametric representation of inversion-conforming points as related to corresponding variations in pertinent orthogonal measurements, are considered, in accordance with the present invention, to represent respective data-point projections.

In accordance with the present invention, data points, as represented by data-point sets, may be considered to be points which are designated by sampled (or alternately provided) coordinate locations which are generally obtained by some form of error affected sample acquisition, and hence not generally restricted to the locus of a respective fitting function. Conforming points, as represented by conforming data sets, on the other hand, are considered (or determined) in accordance with the present invention to be restricted to the locus of at least some form of fitting function or alternate approximating representation. In accordance with the present invention, considering likelihood in correspondence with conforming data sets will allow for the rendering of vanishing function deviations.

Vanishing function deviations $\phi_{nrk}$ can be defined in accordance with the present invention as inversion deviations evaluated with respect to ICDS or any alternately valid set of variable values, said set of values establishing conformance such that for an ideal descriptive equation the function deviations may be assumed to vanish, e.g., $$\phi_{nrk} = -P_0 + \left[ Q_0 - \sum_{i=1}^{I} P_i Q_i \right]_{nrk} \Rightarrow 0. \tag{32}$$

Parametrically represented deviations $\phi$ can be rendered by replacing approximating parameters of a represented inversion deviation with undetermined parametric representations, or adjustment parameters, $P_i = P_i + \delta P_i$ and $P_0 = P_0 + \delta P_0$.

$$\varphi = Q_0 - P_0 - \sum_{i=1}^{I} P_i Q_i. \tag{33}$$

Adjustment residuals $\phi(x_{1k}, \ldots, x_{Nk})$ are here defined as parametrically rendered deviations which are represented for adjustment purposes in correspondence with data point defining set values.

Adjustment deviations $\phi(x_{1k}, \ldots, X_{nrk}, \ldots, x_{Nk})$ can be defined in accordance with the present invention as parametrically rendered function-conforming data sets which are represented for adjustment purposes in correspondence with respective adjustment variable values (e.g., $X_{nrk} = x_{nrk} + \delta X_{nrk}$).

$$\varphi(\mathbf{x}_{1k}, \ldots, X_{nrk}, \ldots, \mathbf{x}_{Nk}) = -P_0 + \left[ Q_0 - \sum_{i=1}^{I} P_i Q_i \right]_{x_{1k}, \ldots, X_{nrk}, \ldots, x_{Nk}}. \tag{34}$$

Assuming infinitesimal adjustments, the function-conforming data sets as expressed by Equations 34 can be precisely rendered by first order Taylor series expansions to represent both the considered variables and the appropriate inversion parameters. In the limit as said infinitesimal adjustments approach zero (i.e., $\delta X_n \to 0$, $\delta P_0 \to 0$, and $\delta P_i \to 0$) the respective adjustment deviations are identically expressed by first order Taylor series expansions as rendered by Equations 35.

$$\varphi(\mathbf{x}_{1k}, \ldots, X_{nrk}, \ldots, \mathbf{x}_{Nk}) \equiv \left[ Q_0 + \frac{\partial Q_0}{\partial x_n} \delta X_n \right]_{nrk} - \tag{35}$$
$$P_0 - \delta P_0 -$$
$$\sum_{i=1}^{I} \left[ P_i Q_i + Q_i \delta P_i + P_i \frac{\partial Q_i}{\partial x_n} \delta X_n \right]_{nrk}.$$

The function deviations are assumed to be eliminated by rendering the vanishing contributions of Equations 32 as equal to zero, and correspondingly setting the sum of the infinitesimal contributions of Equations 35 also equal to zero.

$$\cdot \left[ \delta X_n \left( \frac{\partial Q_0}{\partial x_n} - \sum_{i=1}^{I} P_i \frac{\partial Q_i}{\partial x_\eta} \right) \right]_{nrk} - \delta P_0 - \left[ \sum_{i=1}^{I} Q_i \delta P_i \right]_{nrk} = 0. \tag{36}$$

Unfortunately, both unknown measurement bias which is related to an insufficiently large collection of random samples, and unknown measurement bias which might be associated with individual measurement technique will be inherently linked to respective coordinate offsets. Hence, in accordance with the preferred embodiment of the present invention, variations in coordinate-related bias, which may be represented by the $\delta P_0$ as included in Equations 36, may be neglected or set to zero in rendering minified function deviations.

An inversion can now be represented which will minify function deviations subject to the limits of inherent variations in measurement bias. Rendering a bias-free likelihood estimator as a function of adjustment variables and determined bias adjustments, then subsequently subjecting the exponent of the rendered said estimator to maximizing operations with respect to said adjustment variables and bias adjustments will yield Equation 37, $$-\sum_{k=1}^{K} \sum_{n=1}^{N} \sum_{r=1}^{R_{nk}} W_{nrk}(\mathbf{x}_{nk} - x_{nrk})[\delta X_{nrk} - \delta P_0(1 - \theta_{nrk})] = 0, \tag{37}$$

wherein the offsets and bias $\sqrt{o}_n$ along with respective diminishments are included as coordinate-oriented components $\theta_{nrk} P_0$ of the considered offset value $P_0$.

In accordance with the present invention, in order to establish compatibility with the bias-free likelihood estimator, the estimated offset value $P_0$ should be considered to include the estimated measurement bias; and hence, the respective variation $\delta P_0$ in the adjustments of Equations 36 should be correspondingly set to zero. Setting said variation to zero in Equations 36, but not in Equation 37, then multiplying Equations 36 by undetermined multipliers $\lambda_{nrk}$, adding the ensuing equations to Equation 37, and equating the sum of the considered coefficients of like deviations to zero will yield Equations 38, 39, and 40.

$$\sum_{k=1}^{K} \sum_{n=1}^{N} \sum_{r=1}^{R_{nk}} (1 - \theta_{nrk}) W_{nrk}(\mathbf{x}_{nk} - x_{nrk}) = 0. \tag{38}$$

$$\sum_{k=1}^{K} \sum_{n=1}^{N} \sum_{r=1}^{R_{nk}} \lambda_{nrk} [Q_i]_{nrk} = 0. \tag{39}$$

$$x'_{nk} - x_{nrk} = \frac{-\lambda_{nrk}}{W_{nrk}} \left[ \left( \frac{\partial Q_0}{\partial x_n} + \sum_{i=1}^{I} P_i \frac{\partial Q_i}{\partial x_n} \right) \right]_{nrk}. \quad (40)$$

Equations 38 through 40 provide both for maximizing likelihood and minifying function deviations. The subscripted theta $\theta_{nrk}$ in Equation 38 represent determined direction cosines or alternate bias and/or offset restraints. Said direction cosines may be considered in accordance with the present invention as expressed by successive approximations of Equations 41.

$$\theta_{nrk} = \left[ \frac{\partial x_n}{\partial Q_0} \right]_{nrk}. \quad (41)$$

In accordance with the present invention, the $\theta_{nrk}$ as considered in Equation 38 should respectively reflect the components of alignment of the single component offset and/or measurement bias with each of the $x_n$ coordinate axes.

In accordance with the present invention, each considered component offset and/or measurement bias may be individually or collectively grouped or isolated by including direction cosines or alternate restraints in rendering the respective values for $\theta_{nrk}$.

Equations 40 represent the respective coordinate-oriented data-point projections $x_{nk} - x_{nrk}$ as proportional to a partial differential change in the considered function deviations divided by the respective SPD weighting coefficient. Said Equations 40 may be alternately arranged to provide representation for the proportionality constants $\lambda_{nrk}$ as expressed by Equations 42.

$$\lambda_{nrk} = \frac{W_{nrk}(\mathbf{x}_{nk} - x_{nrk})}{-\left[ \frac{\partial \phi}{\partial x_n} \right]_{nrk}}. \quad (42)$$

Re-arranging Equation 38 to form Equation 43, and combining Equations 42 with Equation 39 to form Equations 44 will yield form for a set of independent equations which may be implemented to satisfy conditions of maximum likelihood in correspondence with both minified function deviations and slope handling as well as dispersion-accommodating variability.

$$\sum_{k=1}^{K} \sum_{n=1}^{N} \sum_{r=1}^{R_{nk}} W_{nrk}(\mathbf{x}_{nk} - x_{nrk}) = \sum_{k=1}^{K} \sum_{n=1}^{N} \sum_{r=1}^{R_{nk}} \theta_{nrk} W_{nrk}(\mathbf{x}_{nk} - x_{nrk}). \quad (43)$$

$$\sum_{k=1}^{K} \sum_{n=1}^{N} \sum_{r=1}^{R_{nk}} \frac{W_{nrk}(\mathbf{x}_{nk} - x_{nrk})}{-\left[ \frac{\partial \phi}{\partial x_n} \right]_{nrk}} [Q_i]_{nrk} = 0. \quad (44)$$

In accordance with the present invention, in the limit as the considered adjustments to the approximating correspondence approach zero, by minifying function deviations and allowing addends to be evaluated in correspondence with respective ICDS, all series terms including existing higher order terms and even infinite order terms are retained and subsequently included in the formulation of Equations 43 and 44. Hence said Equations 43 and 44 as implemented with appropriate SPD weighting coefficients, and assuming normal uncertainty distributions, should render statistically accurate data inversions as considered within the limitations of inherent measurement reduction bias.

Equations 43 and 44 are identical in nature to Equations 24 and 25, with exception that in said Equations 43 and 44 the explicit bias and offset are confined to alignment with the coordinate which corresponds with variations in the considered dependent function or variable $Q_0$ and stored as the parameter $P_0$ in correspondence with Equation 30; and also, Equation 43 combined with Equations 44 do not provide for the evaluation of nested parameters.

Equations 44, as alternately derived to provide for the evaluation of any included nested parameters would take the somewhat more general form of Equations 45, $$\sum_{k=1}^{K} \sum_{n=1}^{N} \sum_{r=1}^{R_{nk}} \frac{W_{nrk}(\mathbf{x}_{nk} - x_{nrk})}{-\left[ \frac{\partial \phi}{\partial x_n} \right]_{nrk}} \left[ \frac{\partial \phi}{\partial P_j} \right]_{P_0 \ldots P_J} = 0, \quad (45)$$

which can be alternately written, $$\sum_{k=1}^{K} \sum_{n=1}^{N} \sum_{r=1}^{R_{nk}} W_{nrk}(\mathbf{x}_{nk} - x_{nrk}) \left[ \frac{\partial \phi}{\partial P_j} \right]_{P_0 \ldots P_J} = 0, \quad (46)$$

wherein the included partial derivatives of $x_{nrk}$ in Equations 46 and the partial derivatives of $\Phi$ in Equations 45 as rendered with respect to $P_j$ for a bias-free likelihood estimator, considered in accordance with the present invention, can be taken with respect to each considered adjustment parameter except for $P_0$. For these examples, Equation 43 or an alternate rendition of the same will provide for representing the additional independent equation necessary to include the evaluation of the coordinate offset and respective bias $P_0$.

Alternately, and also in accordance with the present invention, said additional independent equation may be provided in correspondence with a bias-reflective estimator by taking said partial derivatives of $x_{nrk}$ in Equations 46 or said partial derivatives of $\phi$ in Equations 45 with respect to $P_0$. Such a bias-reflective estimator may in fact be considered useful for some applications, and specifically for cases in which bias is to be ignored. Equation 43 can be respectively rendered in the form to ignore bias by setting all of the $\theta_{nrk}$ to zero.

Alternate Single-Component Likelihood Estimators

In lieu of rendering vanishing function deviation, by referring back to Equations 30 and 40 and alternately expressing the root solution elements $x_{nrk}$ as functions of the respective measurements $x_{nk}$ minus related errors deviations $\Delta x_{nrk}$, an by then representing Equation 30 by rendering Taylor series expansions around said variable measurements, and combining the expanded equations with Equations 40, the resulting Equations 47 may be alternately implemented for rendering lower order approximations in correspondence with terms of Taylor series expansions, e.g., $$\frac{\lambda_{nrk}}{W_{nrk}}\left[\left(\frac{\partial Q_0}{\partial x_n}-\sum_{i=1}^{I}P_i\frac{\partial Q_i}{\partial x_n}-\ldots\right)\left(\frac{\partial Q_0}{\partial x_n}-\sum_{i=1}^{I}P_i\frac{\partial Q_i}{\partial x_n}\right)\right]_{x_{1k},\ldots,x_{Nk}} = \tag{47}$$

$$(\mathbf{x}_{nk}-x_{nrk})\left[\frac{\partial \phi}{\partial x_n}\right]_{x_{1k},\ldots,x_{Nk}} + \left[Q_0-P_0-\sum_{i=1}^{I}P_iQ_i\right]_{nrks}.$$

The included continuation dots represent second and higher order Taylor series terms. Disregarding deleterious lower order approximation effect and writing Equations 47 to exclude said second and higher order Taylor series terms will correspondingly render the single component approximation which is represented by Equations 48, $$\frac{\lambda_{nrk}}{W_{nrk}}\left[\frac{\partial Q_0}{\partial x_n}-\sum_{i=1}^{I}P_i\frac{\partial Q_i}{\partial x_n}\right]^2_{x_{1k},\ldots,x_{Nk}} \approx \left[Q_0-P_0-\sum_{i=1}^{I}P_iQ_i\right]_{x_{1k},\ldots,x_{Nk}}, \tag{48}$$

and which may be alternately written $$\lambda_{nrk}\approx\frac{\left[Q_0-P_0-\sum_{i=1}^{I}P_iQ_i\right]_{x_{1k},\ldots,x_{Nk}}}{\sum_{n=1}^{N}\frac{1}{W_{nrk}}\left[\frac{\partial \phi}{\partial x_n}\right]^2_{x_{1k},\ldots,x_{Nk}}}. \tag{49}$$

For possibly considered applications in which the SPD weighting coefficients may be alternately represented as the inverse of respective measurement variance, the denominator on the right hand side of Equations 49 may take the form traditionally referred to as the effective variance $v_{\phi k}$.

$$v_{\phi k}=\sum_{n=1}^{N}\sigma_{nk}^2\left[\frac{\partial \phi}{\partial x_n}\right]^2_{x_{1k},\ldots,x_{Nk}}. \tag{50}$$

In accordance with the present invention, the excluding of second and higher order Taylor series terms in the rendering of Equations 49 will disallow the minifying of function deviations. However, the multipliers $\lambda_{nrk}$ as approximated by Equations 49 may be conveniently considered to be independent of the n subscript. Thus, by neglecting bias, and assuming single-valued inversion functions, both the n and r subscripts can be dropped from the multipliers $\lambda$, and Equations 38, 39, and 42 as spuriously considered in correspondence with Equations 49, may be approximated by the single component form which is expressed by Equations 51 through 53, $$\sum_{k=1}^{K}\lambda_k\approx 0, \tag{51}$$

$$\sum_{k=1}^{K}\lambda_k[Q_i]_{nk}\approx 0, \tag{52}$$

$$\lambda_k\approx\frac{\left[Q_0-P_0-\sum_{i=1}^{I}P_iQ_i\right]_{x_{1k},\ldots,x_{Nk}}}{\sum_{n=1}^{N}\frac{1}{W_{nrk}}\left[\frac{\partial \phi}{\partial x_n}\right]^2_{x_{1k},\ldots,x_{Nk}}}, \tag{53}$$

which can be readily combined either to render simplified single component projections for effectuating lower order ICDS processing with single combined component weighting being represented to include respective complementary weighting coefficients; or to alternately, provide traditional and modified forms of single component residual deviations processing as rendered to include effective variance or alternately considered single component residual weighting.

The derivation of Equations 49 and the subsequent rendition of Equations 51 through 53 establishes a variety of type representations for providing first order approximations of maximum likelihood, for example:

1. setting $W_{nk}=1/V_{nk}$, then $$\lambda_k\approx\frac{\left[Q_0-P_0-\sum_{i=1}^{I}P_iQ_i\right]_{x_{1k},\ldots,x_{Nk}}}{\sum_{n=1}^{N}V_{nk}\left[\frac{\partial \phi}{\partial x_n}\right]^2_{x_{1k},\ldots,x_{Nk}}}, \tag{54}$$

for rendering traditional forms of maximum likelihood estimating being established in correspondence with the variability in the measurement of the dependent variable as a first order form of single component residual displacements processing, including forms of maximum likelihood estimating being rendered in correspondence with the variability in the measurement of the dependent variable, and wherein considered negligible terms in the denominator of Equations 54 need not be included;

2. setting $W_{nk}=H^2_{nk}/V_{nk}$, for assumed homogeneous variability then $$\lambda_k\approx\frac{\left[Q_0-P_0-\sum_{i=1}^{I}P_iQ_i\right]_{x_{1k},\ldots,x_{Nk}}}{\sum_{n=1}^{N}\frac{V_{nk}}{H^2_{nk}}\left[\frac{\partial \phi}{\partial x_n}\right]^2_{x_{1k},\ldots,x_{Nk}}}\sim$$

$$\frac{1}{\prod_{\eta=1}^{N}V_{\eta k}\left[\frac{\partial \phi}{\partial x_\eta}\right]^{2/N}_{\eta k}}\left[Q_0-P_0-\sum_{i=1}^{I}P_iQ_i\right]_{x_{1k},\ldots,x_{Nk}}, \tag{55}$$

for rendering Discriminate Reduction Data Processing (ref. U.S. Pat. No. 5,652,713) as a first order form of single component residual displacements processing, wherein the terms of the denominator of Equations 55 may be combined to render the inverse of a transformation weight factor with included precision normalizing;

3. rendering Function Similation to include forms of Inverse Deviation Variation Weighting (ref. U.S. Pat. No. 6,181, 976 B1);

for rendering forms of single component residual displacements processing, wherein the terms of the denominator of Equations 49 may be combined to render alternate forms of said deviation variation weighting, e.g., by setting $W_{nk} = H^2_{nk}/v_{\phi k}$, then $$\lambda_k \approx \frac{\left[Q_0 - P_0 - \sum_{i=1}^{I} P_i Q_i\right]_{x_{1k},\ldots,x_{Nk}}}{\sum_{n=1}^{N} \frac{v_{nk}}{\mathcal{H}^2_{nk}} \left[\frac{\partial \phi}{\partial x_n}\right]^2_{x_{1k},\ldots,x_{Nk}}} = \tag{56}$$

$$\frac{1}{v_{\phi k} \prod_{\eta=1}^{N} \left[\frac{\partial \phi}{\partial x_\eta}\right]_{\eta k}} \left[Q_0 - P_0 - \sum_{i=1}^{I} P_i Q_i\right]_{x_{1k},\ldots,x_{Nk}} ;$$

and 4. in accordance with the present invention, rendering first order estimates of maximum likelihood in correspondence with single component data-point projections with complementary weighting coefficients being respectively included in rendering terms of the denominator of Equations 49, and wherein individual terms in the denominator of Equations 49 may not necessarily be included to establish at least some form of single component ICDS processing in accordance with the present invention.

Alternate representations can also be rendered in correspondence with other renditions of SPD weighting W. Unfortunately, and depending upon the order of vanishing derivatives, by neglecting higher order terms as in the formulating of Equations 49 through 53 or in considering alternate renditions, the resulting equations may consequently include unwarranted representation for related function deviations which are not inclined to vanish during the subsequent inversion processing. In accordance with the preferred embodiment of the present invention, the rendering of multivariate maximum likelihood estimates in terms of variations in of orthogonal data-point projections is preferred for rendering data inversions when significant errors occur in the measurement of more than one variable.

A BRIEF DESCRIPTION OF RELATED ART

Traditional forms of likelihood estimating are based upon the statistics of representative measurement whereby likelihood is presumably established as related to variations or effective variations of measurements from unknown true values. M. Clutton-Brock (ref. Technometrics, Vol. 9, No. 2, pp. 261–269, 1967), briefly discussed rendering maximum likelihood in terms of variations of dependent variable measurements from unknown true values. He also briefly discussed an alternate approach of maximizing likelihood in terms of maximum likelihood estimates of said unknown true values. He concluded that such an alternate approach, being considered when errors exist in the measurement of more than one variable, would be "both inefficient and tedious . . . ". His paper then went on to suggest a model for estimating nonlinear maximum likelihood based upon single component residual displacements. R. A. Fisher suggested in a much earlier paper (ref. Royal Society of London, Vol. 222, pp. 309–368, 1922) that "We must confine ourselves to those forms which we know how to handle . . . ". Hence, past efforts to render inversions of both linear and nonlinear data, as considered for errors in more than a single variable, have focused on representing approximate forms of maximum likelihood estimating as limited to single component residual displacements.

With these considerations, and without innovations of the present invention, a traditional first order maximum likelihood estimator may be respectively established as related to single component residual displacements by:

1. neglecting slope compensating normalizations,
2. neglecting pertinent second and higher order Taylor expansion series terms,
3. representing single component residual displacements, and
4. ignoring measurement and offset bias.

The single component likelihood as traditionally rendered might be considered by the simplified form of Equations 57, $$L_n = \prod_{k=1}^{K} \mathcal{P}(e_{nk}), \tag{57}$$

wherein the $e_{nk}$ represents error deviations as single component residual displacements between the error affected measurements $x_{nk}$ and assumed mean representations $\bar{x}_{nk}$ for true values, which are actually unknown, i.e., $$e_{nk} \approx x_{nk} - \bar{x}_{nk} \tag{58}$$

The assumed mean representations $\bar{x}_{nk}$ for said true values are dubbed invariant; and consequently the considered variability of said single component residual displacements $e_{nk}$ are represented for traditional applications by estimates of variability as considered over the ensembles of all possible error affected measurements which would include the actual measurements, $x_{nk}$, said estimates of variability comprising the variance in the measurements of $x_{nk}$ plus the considered dispersion effects caused by pertinent errors in antecedent measurements. Said estimates of variability are traditionally rendered by an effective variance $v_{nk}$ being generally considered as for linear application in the form of Equations 59.

$$v_{nk} = \sum_{\eta=1}^{N} \left(\sigma_\eta \frac{\partial x_n}{\partial x_\eta}\right)^2_{nk}. \tag{59}$$

Alternately, In accordance with the present invention, measurements, once taken, are presumably invariant, and hence probability densities of respective data-point projections, should establish a more reliable likelihood which is related directly to variations in the locus of approximating points as established by respective fitting parameters in correspondence with possible errors in the respective orthogonal variable measurements.

Other currently available renditions of maximizing likelihood may incorporate alternately considered or spuriously rendered higher order approximations and/or they may represent effective variance either independent of, or as a rendered function of included adjustment parameters to correspondingly provide somewhat deficient nonlinear models as generalized extensions of the respective linear models. Unfortunately, and depending upon the order of vanishing derivatives, by neglecting higher order terms (as for example in the formulating of Equations 49 and as are similarly neglected by the single component assumption of Equations 57) the resulting variety of single component equations which might be rendered by the considering of Equations 57 may include unwarranted representation for related function deviations which are not inclined to vanish during subsequent inversion processing.

Early references describing the above mentioned traditional approach to linear and non-linear regression analysis include the work of D. York who followed earlier works of Adcock, Pearson, Jones, Deming, Worthing, Teissier, and Kermack in representing a form of maximum likelihood estimating as considered for linear applications being limited to representing single component residual displacements. (ref. Can. J. Phys., Vol. 44, pp. 1079–1086, 1966). Concurrently, M. Clutton-Brock applied the same linear assumptions and single component limitations to correspondingly establish limited application maximum likelihood for nonlinear fitting functions of the form y=f(x).

Credit is certainly due to these early pioneers as well as to their even earlier predecessors Legendre and Gauss, and others who helped to established original and traditional methods and respective means for rendering simple data inversions. The linear single component residual displacement models for representing maximum likelihood are sufficiently adequate for simple linear applications. The generalized extensions to the linear models may alternately provide for nonlinear applications which restrict errors to a single dependent variable, and which may also require sufficient measurements to represent normal uniform error distributions corresponding to each represented independent variable coordinate location. These single component residual displacement models are somewhat less effective for handling inversions of sparse data and inversions of data with significant errors in more than a single variable.

The slightly inadequate reduction concepts provided by these early efforts continue to be implemented by alternate processing techniques (e.g., ref. ISBN 0-521-43064-X, Cambridge University Press, New York, pp. 650–700, ©1986–1992), however even more recent efforts to render accurate data inversions continue to reflect original developments and extensions of maximum likelihood estimating as originally considered for linear applications or as alternately adapted for nonlinear applications (ref. Austral. J. Statist. Vol. 42, pp. 500, 2000).

Recent efforts also include earlier inventions of the present inventor. These inventions are:
1. Discriminate Reduction Data Processor (ref. U.S. Pat. No. 5,619,432),
2. Discriminate Reduction Data Processing (ref. U.S. Pat. No. 5,652,713),
3. Discriminate Reduction Data Acquisition (ref. U.S. Pat. No. 5,884,245), and
4. Adept Data Processor Implementing Function Similation with Inverse Deviation Variation Weighting (ref. U.S. Pat. No. 6,181,976 B1).

Each of these four said earlier inventions of the present inventor include either transformation weight factors or alternate forms of inverse deviation variation weighting and thereby establish means for rendering accurate inversions for sparse two dimensional data in the limit as the error deviations in represented independent variable measurements become insignificant, and also for multivariate data when the error deviations in the measure of all included variables can be neglected. Alternate means, such as implementing characteristic form iterations and/or rendering forms of conformal analysis to include zeta parameter iterations, are provided by the forth of said four inventions to compensate for errors in more than a single variable.

In accordance with U.S. Pat. No. 6,181,976 B1 implementation of inverse deviation variation weighting includes at least the following:
1. representing at least one weighting coefficient,
2. rendering said at least one weighting coefficient in a form compatible to be included in representing a respective weighting factor of a corresponding addend,
3. representing at least one equation, and
4. representing said at least one weighting factor to implement said at least one form of inverse deviation variation weighting in representing said at least one equation;
said at least one equation being rendered in a form compatible to be included in representing a set of independent equations as rendered for solution by said data processing system;
said at least one weighting coefficient being included in representing said at least one equation;
representation for said at least one weighting coefficient being generated in correspondence with representative measure of respective proportion to at least one evaluation for at least one derivative;
said at least one derivative being a variable dependent derivative of a function comprising at least one isolated term function of a represented function deviation;
said variable dependent derivative being a function of at least one variable;
said function deviation being a function of a plurality of variables;
said representative measure of said at least one derivative being determined in correspondence with represented measure of at least one of said plurality of variables;
said at least one weighting coefficient being represented as substantially corresponding in proportion to the absolute value of said representative measure of said at least one derivative being raised to a negative power other than negative two.

In accordance with U.S. Pat. Nos. 5,619,432; 5,652,713; and 5,884,245; a transformation weight factor can be defined as inversely proportional to the absolute value of the $N^{th}$ root of the square of the product of differential changes in phenomenon (or related approximation deviation) with respect to each of N express fundamental variables (as sampled or evaluated at representative data points) or constant proportion of the same.

Each of said four inventions of the present inventor consider the rendition of transformation weight factors or include representing forms or degenerate forms of inverse deviation variation weighting, or both. Said four inventions do not correspondingly establish any rendered form for including multivariate dispersion coupling, none of said four inventions provide means for representing ICDS processing, and none of said four inventions provide adequate means for minifying or representing minified function deviations when errors exist in the measurement of more than a single variable.

The process of rendering forms of maximum likelihood estimating with respect to data-point projections in accordance with the present invention has not been previously considered. The concept of implementing dispersion-accommodating slope handling coefficients in combining orthogonal data-point projections for rendering nonlinear forms of maximum likelihood estimating in accordance with the present invention has evidently not been previously conceived. The concept of compensating for measurement and offset bias by rendering the removal of said measurement and offset bias along with respective function adjustments from likelihood representations, and subsequently maximizing said likelihood on said function adjustments in accordance with the present invention, has not been previously considered; and the process of representing orthogonal data-point projections to minify function deviations in correspondence with ICDS in accordance with the present invention is evidently heretofore unknown.

SUMMARY OF THE INVENTION

In view of the foregoing, it is an object of the present invention to provide automated forms of data processing and corresponding processes which will establish maximum likelihood in correspondence with data-point projections being related to inversion-conforming data sets. It is an object of the present invention to provide automated forms of data processing and corresponding processes which will consider minifying function deviations in correspondence with orthogonal data-point projections being represented in rendering forms of inversion-conforming data sets processing. It is further object of the present invention to provide option for rendering component measurement variability as the square of estimated measurement precision plus the added dispersion caused by error deviations in related antecedent variable measurements. It is another object of the present invention to provide for respectively including coordinate-related estimates of dispersion-accommodating measurement variability and respective complementary weighting in correspondence with each considered sample and each pertinent or simultaneously considered degree of freedom in order to establish maximum likelihood with respect to individually considered orthogonal data-point projections. It is another object of the present invention to provide option for rendering dispersion in determined measure as a function of the variabilities of orthogonal measurement sampling to establish respective representation for complements of orthogonal variability and provide for rendering considered forms of complementary weighting. It is an object of the present invention to provide means to isolate and evaluate coordinate offsets as associated with respective measurement bias. It is a further object of the present invention to allow for design implementation of slope handling for maximum likelihood estimating, and to provide the respective option of slope unification by normalizing the on the $N^{th}$ root of the product of differential change in the considered variables. It is another object of the present invention to allow for implementing represented uncertainties as either heterogeneous or homogeneous over the range and domain of the considered data. It is a further object of the present invention to provide for rendering inversions of simulated data to correct reduction processing for either or both coordinate related uncertainty and/or inversion related bias. It is an object of the present invention to generate reduction products as processing system output to represent or reflect corresponding data inversions. Still another object of this invention is to provide means for producing data representations which establish descriptive correspondence of determined parametric form in order to establish values, implement means of control, or characterize said descriptive correspondence by generated parameters and product output in forms including memory, registers, media, machine with memory, printing, and/or graphical representations.

The foregoing objects and other objects, advantages and features of this invention will be more fully understood by reference to the following detailed description of the invention when considered in conjunction with the accompanying drawings and the included compact disk appendix.

BRIEF DESCRIPTION OF THE DRAWINGS

In order that the present invention may be clearly understood, it will now be described, by way of example, with reference to the accompanying drawings, wherein like numbers indicate the same or similar components as configured for a corresponding application and wherein.

DETAILED DESCRIPTION OF THE INVENTION

Figure 1:
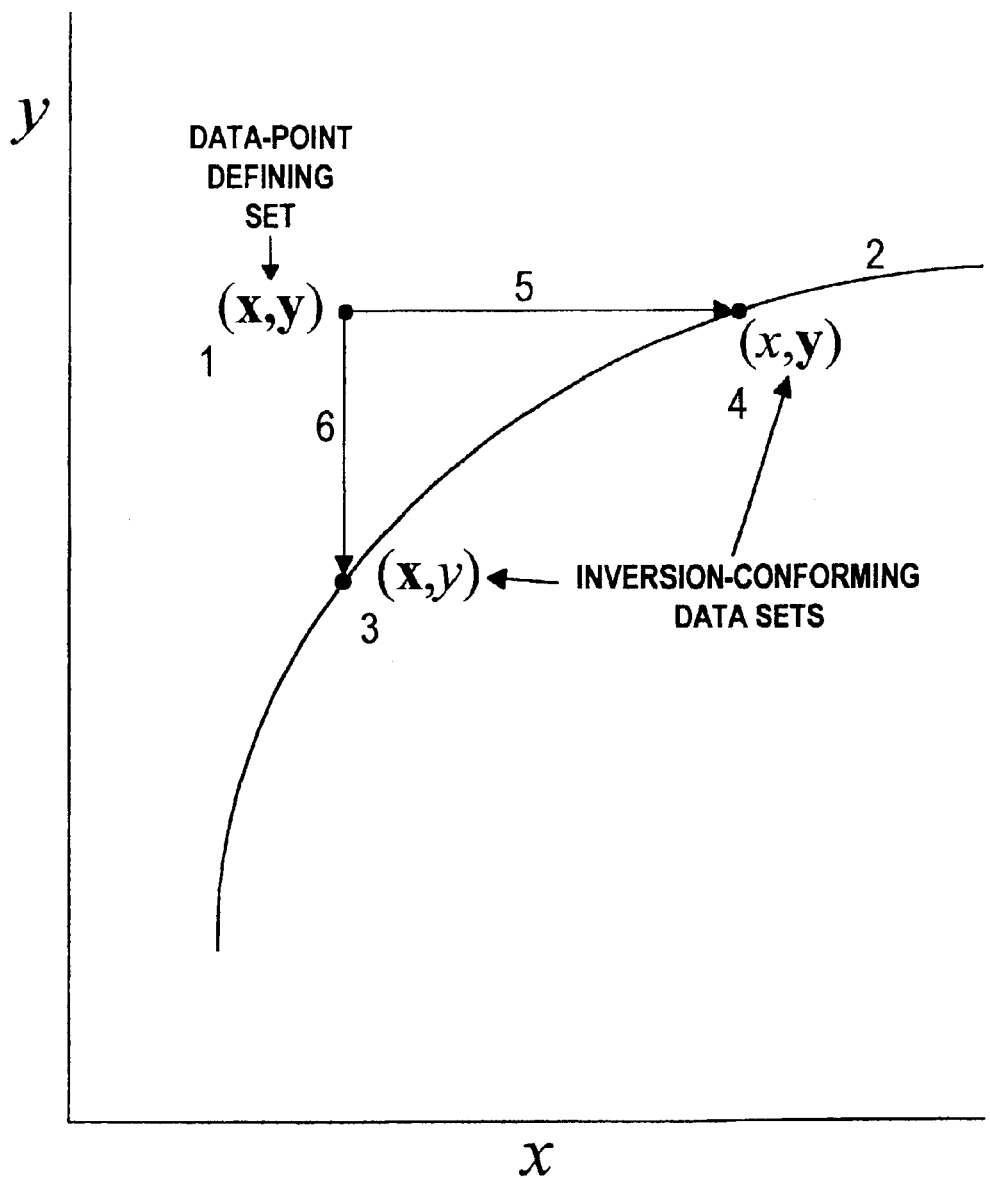
FIG. 1 depicts inversion-conforming data sets for two dimensions and illustrates the concept of orthogonal data-point projections, being generated as the difference between the elements of data-point sets, and respective inversion-conforming data set root solutions while rendering approximating representation for a fitting function in accordance with the present invention.

Referring now to FIG. 1, in accordance with the present invention, inversion-conforming data sets (ICDS) are sets of coordinate designating elements which correspond to the projection of elements of data-point sets (or data-point defining sets) along corresponding coordinates onto a representation of a data inversion comprising an approximating relationship or a considered estimate of the same. For example, the y element of the two dimensional error-affected data-point set (x, y) 1 being respectively projected parallel to the y coordinate axes onto the locus of a fitting approximation 2, as in FIG. 1, will establish the inversion-conforming data set, (x, y) 3 comprising a determined measure for the y variable being restricted to the confines of said fitting approximation as a function of the orthogonal datum sample x. Assuming said fitting approximation to represent a true approximating relationship, then the uncertainty of a correct placement of said determined measure along said confines is dependent solely upon possible dispersions in the sampling of orthogonal measurements being related to said determined measure by said fitting approximation.

Similarly, the x element of said two dimensional error-affected data-point set being respectively projected parallel to the x coordinate axes onto the locus of said fitting approximation, will establish the inversion-conforming data set, (x, y) 4 comprising a determined measure for the x variable being restricted to the confines of said fitting approximation as a function of the datum sample y, said determined measure for the x variable being considered dependent upon the sampled value of y as represented in correspondence with respective fitting parameters estimates and a respectively rendered fitting approximation.

Hence, in accordance with the present invention, and assuming an appropriate approximating relationship, variability in the representation of respective data-point projections 5 and 6 can be considered to be dependent solely upon considered variability in the sampling of the orthogonal elements of respective ICDS. Each respective inversion conforming data set will comprise a root solution element and at least one other element which is orthogonal to said root solution element. The elements of each of said ICDS will correspondingly designate the coordinates of a respective point which will conform to the locus of said data inversion or a current estimate of the same. The corresponding orthogonal data-point projections, x-x 5, and y-y 6, as demonstrated in FIG. 1 (or alternately oriented as x-x, and y-y) may be generated as the difference between the error-affected data-point set elements, x and y, and the root solution elements, x and y, of the respective ICDS; or since proportionate representation of said data-point projections is sufficient for rendering ICDS processing, said data-point projections can be alternately represented as the difference between said root solution elements and said error-affected data-point set.

In accordance with the present invention, the rendering of FIG. 1 in correspondence with only two dimensions does not imply limiting applications of the present invention to only two degrees of freedom. Symbols and pictorial representation are included herein for purposes of clarification, and not for designating nor limiting the specific number of degrees of freedom.

Figure 2:
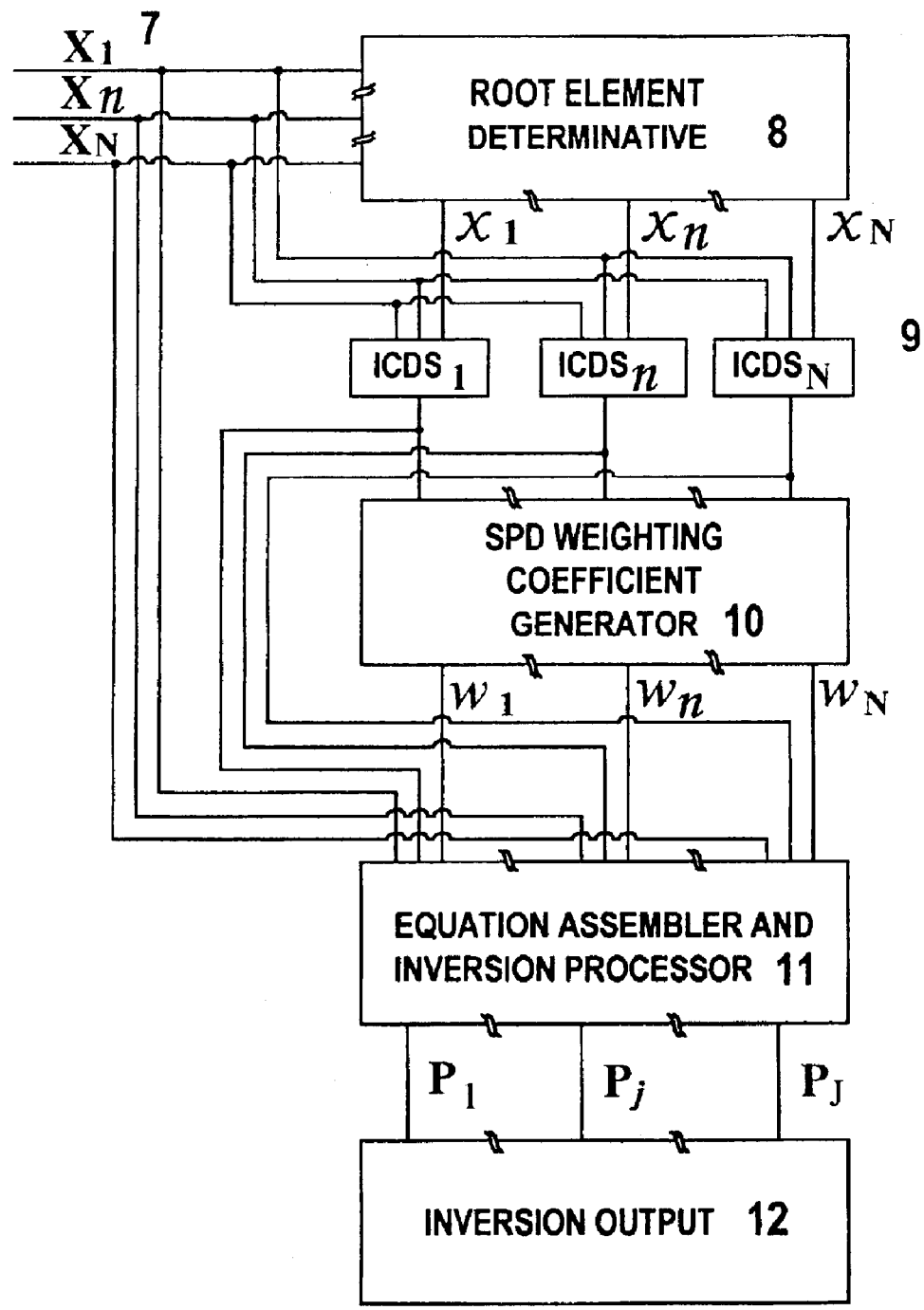
FIG. 2 depicts an example of multivariate ICDS processing as related to the representation of inversion-conforming data sets in accordance with the present invention.

Referring now to FIG. 2 In accordance with the present invention ICDS processing (i.e., inversion-conforming data sets processing) is a form of data processing which implements means for accessing and processing information whereby parameter related approximations may be generated in correspondence with a plurality of data-point projections, said data-point projections being considered in correspondence with respective ICDS.

Referring back to FIG. 1, in accordance with the present invention, data processing is considered to be a form of inversion-conforming data sets processing if said data processing substantially includes at least one of the following:

1. the summing together of at least some addends over at least two variable degrees of freedom during inversion processing, said at least some addends being rendered with normalized and/or weighted, or alternately corresponding units for addition processing and said at least some addends being generated in correspondence with respective data-point projections (e.g. 5 and 6), said data-point projections being related to corresponding ICDS (e.g. 3 and 4), at least two of said ICDS corresponding (in one to one correspondence) to two orthogonal data-point projections along (or parallel to) coordinates which respectively correspond to said at least two variable degrees of freedom, said data-point projections intersecting a respective approximating relationship (e.g. 2) at said corresponding ICDS (e.g. 3 and 4);

2. the rendering of parameter estimating in correspondence with an estimated variability of at least one data-point projection or rendering SPD weighting coefficients in correspondence with said estimated variability, said estimated variability being considered (by representation, assumption, declaration, or definition) by way of selection, acquisition, input, or rendition to be representative of variations in a parametrically determined variable measure of a respective inversion conforming data set, said estimated variability being related to considered variations in sampling of at least one orthogonal element of a corresponding subset of data-point coordinates, and said estimated variability being represented in correspondence with a fitting function or alternate approximating relationship and said at least one element of said subset of data-point coordinates; said determined variable measure being evaluated in correspondence with at least one element of said subset of data-point coordinates, said estimated variability not being rendered as a variance of a respectively considered measurement for the same said determined variable, said respectively considered measurement being included as one of said data-point coordinates, and said estimated variability not being rendered as an effective variance of said respectively considered measurement for the same said determined variable; and 3. the rendering of projection normalizing coefficients in proportion to at least one form of slope-handling coefficients, including the rendering of weighting coefficients and/or weight factors in proportion to the square of at least one form of slope-handling coefficients, said projection normalizing coefficients being rendered and implemented to establish normalizing of data-point projections respectively corresponding to at least one variable degree of freedom in correspondence with said ICDS, excluding alternately considered normalizing coefficients of similar construct being designed, rendered, and implemented to establish weighting of displacements of sampled measurements from assumed true values (i.e. excluding inverse deviation variation weighting coefficients being implemented to provide weighting of function-related deviations, ref. U.S. Pat. No. 6,181,976 B1; also excluding weight factors of similar construct being implemented for the weighting of squared deviations or "squared approximation deviations" while providing at least one form of Discriminate Reduction Data Processing for the evaluation of approximating parameters which substantially minimize parametric expressions which are assumed to represent sums of squares of coordinate-normalized datum variances, ref. U.S. Pat. Nos. 5,619,432; 5,652,713; and 5,884,245; excluding weighting in proportion to the square of slope-handling coefficients with a root designator equal to one being rendered, or being coincidently rendered, as the inverse of an effective variance and respectively establishing the weighting of single component residual displacements as directly related to said single component measurement variability; and excluding weighting of single component residual displacements as directly related to said single component measurement variability being rendered as the inverse of an effective variance).

Referring again to FIG. 2, considering these three items of technique in accordance with the present invention:

Item 1, the summing together of addends over at least two variable degrees of freedom during inversion processing, establishes a plurality of data-point projections in correspondence with at least two variable degrees of freedom and allows for optimizing data inversions in correspondence with more than a single dimension.

Item 2, the rendering of parameter estimating in correspondence with an estimated variability of at least one data-point projection, establishes likelihood related variability in correspondence with respective ICDS in lieu of representing variability of single component residual displacements as directly related to effective said single component measurement variance; and Item 3, the rendering of projection normalizing coefficients in proportion to at least one form of slope-handling coefficients, provides for the unifying of local slopes and the establishing of equivalent units for combining representations of a plurality of data-point projections in correspondence with respective ICDS.

In accordance with the present invention, and depending upon the specific application, any one, or any two, or all three of these said items of technique can or may be included in correspondence with a reduction process to establish a considered suitable, preliminary, or spurious rendition of ICDS processing. Also, in accordance with the present invention, any one or any combination of these three items of technique may be combined with other reduction techniques to alternately generate suitable, preliminary, or spurious renditions of said ICDS processing. For example, in accordance with the present invention, including slope-handling coefficients while excluding variability from the SPD weighting coefficient will establish Equations 24 and 25 for minimizing the sum of squares of coordinate normalized data-point projections without regard to variability. Subsequent corrections and/or adjustments may be respectively implemented to include characteristic form dispersions in a final rendition without the complexities of rendering dispersion accommodating variabilities to establish respective maximum likelihood. Said corrections may be rendered by characteristic form iterations as suggested in accordance with U.S. Pat. No. 6,181,976 B1, or by alternate correction methods which may be available; or they may be implemented in correspondence with characteristic dispersion models and alternate rendition techniques as disclosed herein.

In accordance with the present invention, examples of inversion-conforming data sets processing may include but are not limited to any one or any combination of the following:

1. establishing maximum likelihood in correspondence with or in proportional correspondence with likelihood probability densities of the form expressed by Equation 20 or 21 wherein the $N_{nrk}$ represent projection normalizing coefficients, and the nrk subscripts designate evaluations corresponding to respective said ICDS, said likelihood being related to the variability in the root solution elements of said ICDS from considered fixed sample values of respective data-point sets. Said variability being rendered as related to uncertainty in the accuracy of orthogonally related subsets of said fixed sample values;

2. establishing parameter evaluating in correspondence with or in proportional correspondence with a modified likelihood estimator of the form expressed by Equations 24 or Equations 24 and 25 wherein the weighting coefficient, $W_{nrk}$, might be included, excluded, or rendered as unity, and wherein the nrk subscripts designate evaluations corresponding to respective said ICDS, said likelihood being either spuriously represented or appropriately rendered as related to the variability in the root solution elements of said ICDS from considered fixed sample values of respective data-point sets. Said variability being rendered as related to uncertainty in the accuracy of orthogonally related subset of said fixed sample values;

3. establishing parameter evaluating in correspondence with or in proportional correspondence with a modified likelihood estimator of the form expressed by Equations 24 or Equations 24 and 25 wherein the weighting coefficient, $W_{nrk}$, might be included, excluded, or rendered as unity, and wherein the nrk subscripts designate evaluations corresponding to respective said ICDS, said likelihood being either spuriously represented or appropriately related to the normalizing of data-point projections;

4. establishing parameter evaluating in correspondence with or in proportional correspondence with a modified likelihood estimator of the form expressed by Equation 24 or Equations 24 and 25 wherein the weighting coefficient, $W_{nrk}$, might be included, excluded or rendered as unity, and wherein the nrk subscripts designate evaluations corresponding to respective said ICDS, said likelihood being spuriously related to the normalizing of data-point projections with or without consideration of variability, said parameter evaluating including the correcting of respective inversions by the rendition of characteristic form iterations (ref. U.S. Pat. No. 6,181,976 B1) or by the rendition of alternate inversion correction techniques being related to characterized dispersions in accordance with the present invention;

5. rendering lower order approximations, spurious forms of maximum likelihood, and/or alternately rendering parameter evaluations in correspondence with Equations 51 through 53 by implementing variabilities which represent estimated variations of determined elements of inversion-conforming data sets in terms of the variability of one or more orthogonal measurements of said sets and in terms of a considered approximating relationship;

6. rendering alternate forms of parameter evaluations which incorporate variabilities which respectively represent estimated variability of a correspondingly determined element of an inversion-conforming data set in terms of at least one orthogonal measurement of said set and in terms of a considered approximating relationship;

7. rendering projection normalizing coefficients in proportion to a form of slope-handling coefficients and inversely proportional to the square root of considered variability which represents estimated variability of a determined element of an inversion-conforming data set in terms of at least one orthogonal measurement of said set and in terms of a considered approximating relationship;

8. rendering projection normalizing coefficients in proportion to a form of slope-handling coefficients being rendered in correspondence with at least two orthogonal data-point projections, said data-point projections being considered with respect to at least two corresponding variable degrees of freedom;

9. representing at least one complement of orthogonal element variability being rendered as the variability of a data-point projection in correspondence with the respective inversion-conforming data set root solution element, and in correspondence with an approximative relationship;

10. representing an estimated variability of a determined element of an inversion-conforming data set in terms of at least one orthogonal measurement of said set and in terms of a considered approximating relationship;

and 11. rendering parameter approximating to include considering the estimated variability of at least one root solution element of a respective inversion-conforming data set.

Alternately, in accordance with the present invention, inversion-conforming data sets processing may include, but is not respectively rendered by parameter evaluation techniques which are apparently limited to considering single component variations of scattered measurements from unknown true values wherewith representation of slope-handling coefficients is excluded and whereby said variations in scattered measurements are either completely neglected, or are solely represented by the variance or effective variance of the same said single component measurements.

FIG. 2 depicts an example of ICDS processing as related to the representation of inversion-conforming data sets. In accordance with the present invention information being considered for inversion is passed as an ensemble of samples comprising variable measurements or provided data, e.g., $(x_{1k}, \ldots, x_{nk}, \ldots, x_{Nk})$ 7, to a root element determinative 8, where they are interfaced with approximative form to determine root solution elements which establish respective ICDS 9. Said respective ICDS as determined are availed to a SPD weighting coefficient generator 10 for rendering SPD weighting coefficients or alternate weighting as specified. Said weighting coefficients or said alternate weighting together with pertinent elements of said ensemble and said respective ICDS are passed to an equation assembler and inversion processor 11 wherein said samples are manipulated and combined by operations, which include the summing of addends, to render a respective data inversion and generate respective inversion output 12.

In accordance with the present invention, for applications in which measurement error can be neglected in correspondence with one or more simultaneously considered degrees of freedom, and for applications in which only cursory inversions are required, the summing of addends over a plurality of said simultaneously considered degrees of freedom during said ICDS processing may not be necessary.

In accordance with the present invention, for applications in which uncertainty is either ignored or neglected, SPD weighting coefficients may be omitted or alternately replaced by constant values or preferably they may be represented by squared slope-handling coefficients.

Figure 3:
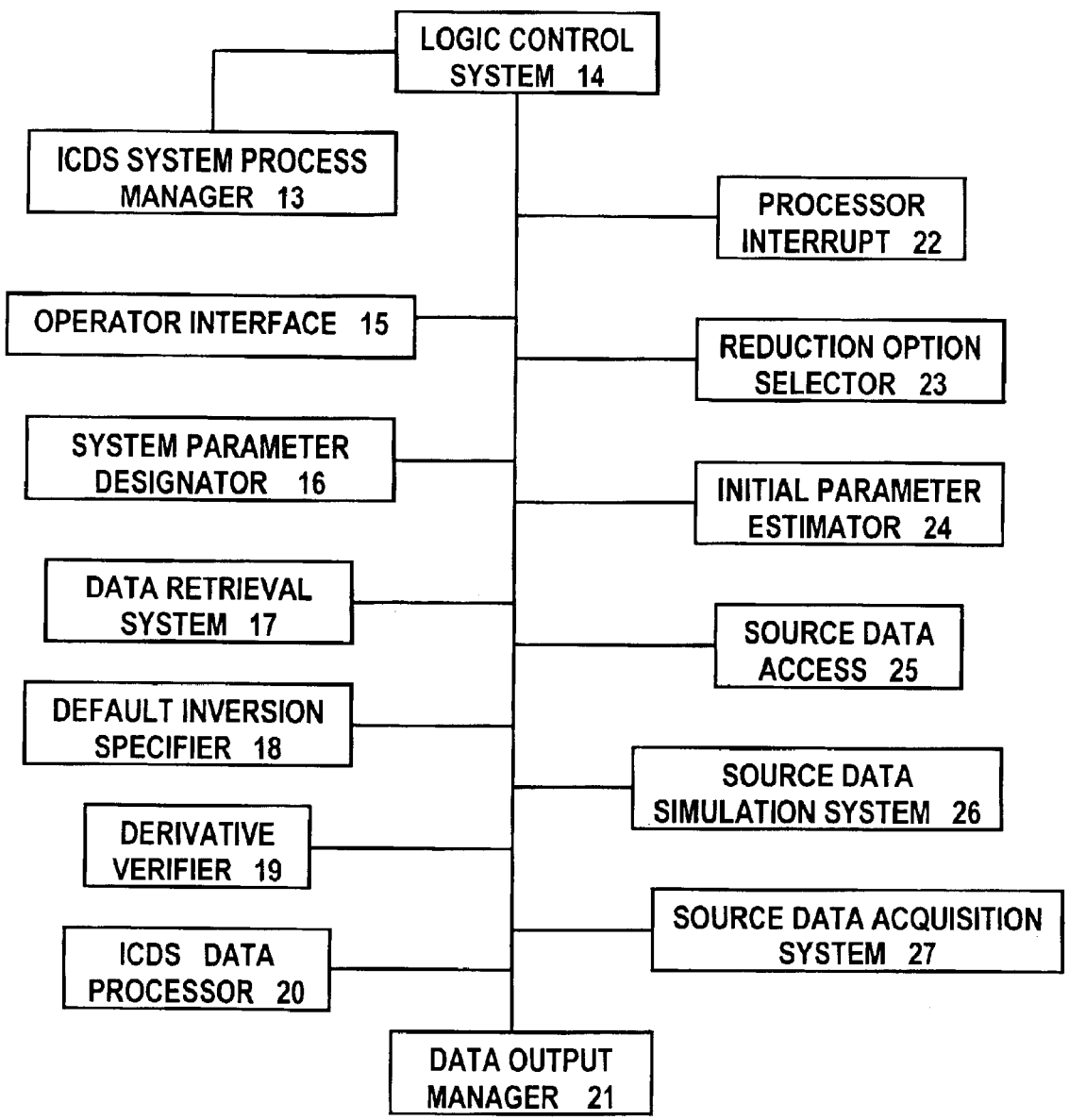
FIG. 3 depicts an ICDS processing system comprising a logic control system and functional components which are activated in accordance with the present invention.

Now referring to FIG. 3, in accordance with the present invention ICDS processing systems are equipped to receive data and to provide steps of automated or semi-automated ICDS processing, thereby providing data reductions and means or media to transfer, store, display, or produce data representations that are assumed to be consistent with variations which are characterized by information being processed. Also, in accordance with the present invention, the included components and peripherals of an ICDS processing system may be interrelated in providing non-independent functional components of integral system parts. The required complexity of a representative ICDS processing system may be dependent upon available information and the corresponding analytic or alternate form of the related approximative equation or descriptive representation, as well as the considered form for product output. Appropriate approximative relationships are generally determined by inherent characteristics of the data being processed.

The left hand portion of FIG. 3 depicts components which might be implemented in rendering an adaptable ICDS system process manager 13 including a logic control system 14, an operator interface 15, a system parameter designator 16, a data retrieval system 17, a default inversion specifier 18, a derivative verifier 19, an ICDS data processor 20, and a data output manager 21.

In accordance with the present invention, the system process manager 13 includes instruction code being acted upon by the logic control system 14 to retrieve data and establish the initial reduction selections and render general commands for executing subsequent processing and output controls.

In accordance with the present invention, a logic control system is a combination of systems or functional items, a machine or composite of machines, or a provided data processing component such as a computer chip, circuitry, or device, any of which provides controls, directly, or indirectly by signals, which activate logic gate and/or switch control circuitry, to provide at least some functions of data processing. A logic control system may also provide control by means of systems operation and common parameter links or alternate configurations for the receipt and transfer of parameters, commands, initial estimates, and/or coded function definitions as may be required. The logic control system 14 is configured with memory and means to effectuate sequential operation of functional components in compliance with operational design or command code which may be provided in the form of control-command logic such as binary code and/or integrated binary logic circuitry. In accordance with the present invention, said logic control system 14 is a logic control system which is configured to provide control to execute consecutively (or in order as designated) at least some steps that are essential to effectuate at least one form of ICDS processing.

The operator interface 15 provides for input commands, interrupts, and/or manual data entry as supported by the logic control system 14.

The system parameter designator 16 allocates representation for data and system-related parameters.

The data retrieval system 17 is an application adapted device such as a user supplied subroutine or alternately dedicated system which provides means for retrieving available data, including data that is to be operated upon during subsequent inversion processing.

The default inversion specifier 18 provides default initial estimates and default option selections for rendering said subsequent inversion processing.

The derivative verifier 19 provides an optional comparison of analytically represented or alternately rendered derivatives with assumed less accurate digitally evaluated derivatives in order to verify rendered form and to thereby establish valid representation for said subsequent inversion processing.

The ICDS data processor 20 provides said subsequent inversion processing.

The data output manager 21 provides for the handling of data output including the rendering of inversions for representing and/or containment and may include options such as portable memory management and/or enhanced forms of data-related display. Said data output manager may also provide means to transfer data representation to or from media and/or to provide alternate forms of product output.

Functions typical of an ICDS system process manager 13 as characterized in FIG. 3 are further exemplified by the command code which is listed in the included Appendix A, wherein exemplary management controls are rendered as QBASIC main program commands. Functions of data retrieval, default inversion specification, derivative verification, and ICDS processing are correspondingly exemplified by the rendered subroutines GETDATA, START, VERIFYD, and ICDSP, which are also included in Appendix A. The Included examples of data output are limited to monitor display but may certainly be modified to provide alternate forms of data output management.

In addition to operations of said ICDS system process manager 13 the ICDS processing system as rendered in FIG.

3 may support alternate functions and peripherals including: a processor interrupt 22, a reduction option selector 23, an initial parameter estimator 24, source data access 25, a source data simulation system 26, a source data acquisition system 27.

The processor interrupt 22 allows for operator interrupt during inversion processing to modify parameters and option selections or to alternately train convergence to provide for an appropriate rendition.

The reduction option selector 23 may provide for either or both an initial or an interactive selection of inversion options. For the exemplary command code which is included in Appendix A a processor interrupt is included in the subroutine ICDSP and a reduction option selector is there also provided by a call to the subroutine SETOP.

The initial parameter estimator 24 may be included to establish initial estimates of fitting parameters for rendering subsequent inversions by successive approximations. Quite accurate initial estimates may be required, especially for applications which involve higher numbers of parameter evaluations. In accordance with the present invention, said initial parameter estimator may include implementing forms of least-squares regression analysis and/or more advanced maximum likelihood estimators. The command code of Appendix A exemplifies an initial parameter estimator as an optional function of the subroutine ICDSP which is alternately implemented for evaluating estimates of coefficient type fitting parameters and/or adjusting parameter estimates by limiting the variable and root selection cycles to only render respective data-point projections in correspondence with a single coordinate axis, and by correspondingly rendering single component ICDS processing, or by alternately rendering single component residual displacement processing, with weighting and reduction procedures corresponding to the default or selected options.

In accordance with the present invention single component ICDS processing is any form of ICDS processing in which the considered data-point projections are limited to a single coordinate axis, said single component ICDS processing being primarily characterized by included representation of respectively rendered projection normalizing coefficients.

The source data access 25 may provide access to a representation of source data to be operated upon by the data retrieval system 17 prior to or during said subsequent inversion processing.

The source data simulation system 26 may be included and implemented to generate characteristic forms of simulated data which may be processed to evaluate considered reduction options in order to establish and verify considered options for selected inversion processing prior to rendering corresponding inversions of critical data. In accordance with the present invention, the source data simulation system 26 may also be implemented for rendering initial estimates of fitting parameters by rendering a display of the available data and allowing for renditions of the fitting approximation to be superimposed and visually inspected while manually or systematically providing alternate fitting parameter estimates.

In addition to data processing operations which might be provided by characteristic ICDS processing systems, more specialized or dedicated systems may be alternately equipped to include a source data acquisition system 27 whereby source data of specific application may be directly collected or generated. For applications which may involve forms of real time data acquisition both digital and/or analog processing techniques may be implemented in rendering or partially rendering respective data inversions. In accordance with the present invention, for some specific applications, the rendering of certain components of SPD weighting coefficients by analog or digital circuitry while simultaneously collecting real time data samples could both improve inversion accuracy and reduce processing time.

Figure 4:
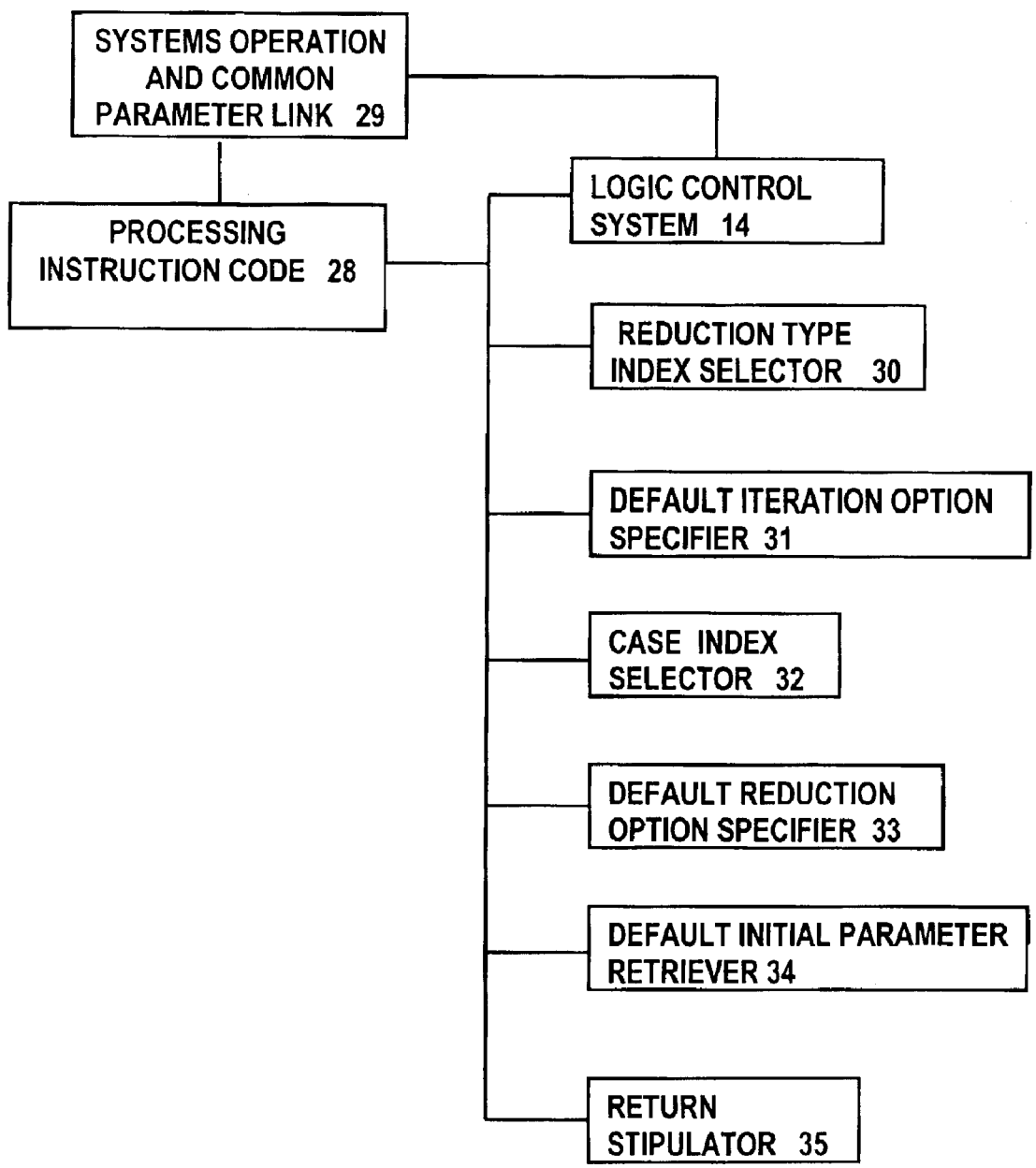
FIG. 4 depicts a default inversion specifier as including processing instruction code which is interfaced with a systems operation and common parameter link and functional components which are activated in accordance with the present invention.

Referring now to FIG. 4, in accordance with the present invention, a default inversion specifier 18 is an application adapted user supplied subroutine, a processing device or alternately dedicated system which implements user supplied application-related information to provide default initial estimates and default option selections for rendering subsequent inversion processing. FIG. 4 depicts a default inversion specifier as including processing instruction code 28 which is interfaced with a systems operation and common parameter link 29 to a logic control system 14 for providing command control of functional components including: a reduction type index selector 30, a default iteration option specifier 31, a case index selector 32, a default reduction option specifier 33, a default initial parameter retriever 34, and a return stipulator 35.

The reduction type index selector 30 provides operator interface for the selection of alternate reduction configurations The default iteration option specifier 31 specifies default selections for the desired number of significant figures, the number of consecutive iteration cycles, the number of integration samples, the variability evaluation integration bounds, and the system computational limits.

The case index selector 32 provides access to respective configuration information.

The default reduction option specifier 33 stipulates the default configuration for adjustment parameter array sizing, parameter evaluation designating, variable cycling, and provides for derivative verification. Said default reduction option specifier also specifies default option selections for rendering variability, weighting, and slope handling.

The default initial parameter retriever 34 provides access to default values for initial parameter estimates.

The return stipulator 35 transfers the logic sequence control back to the instructions of the ICDS system process manager.

Figure 5:
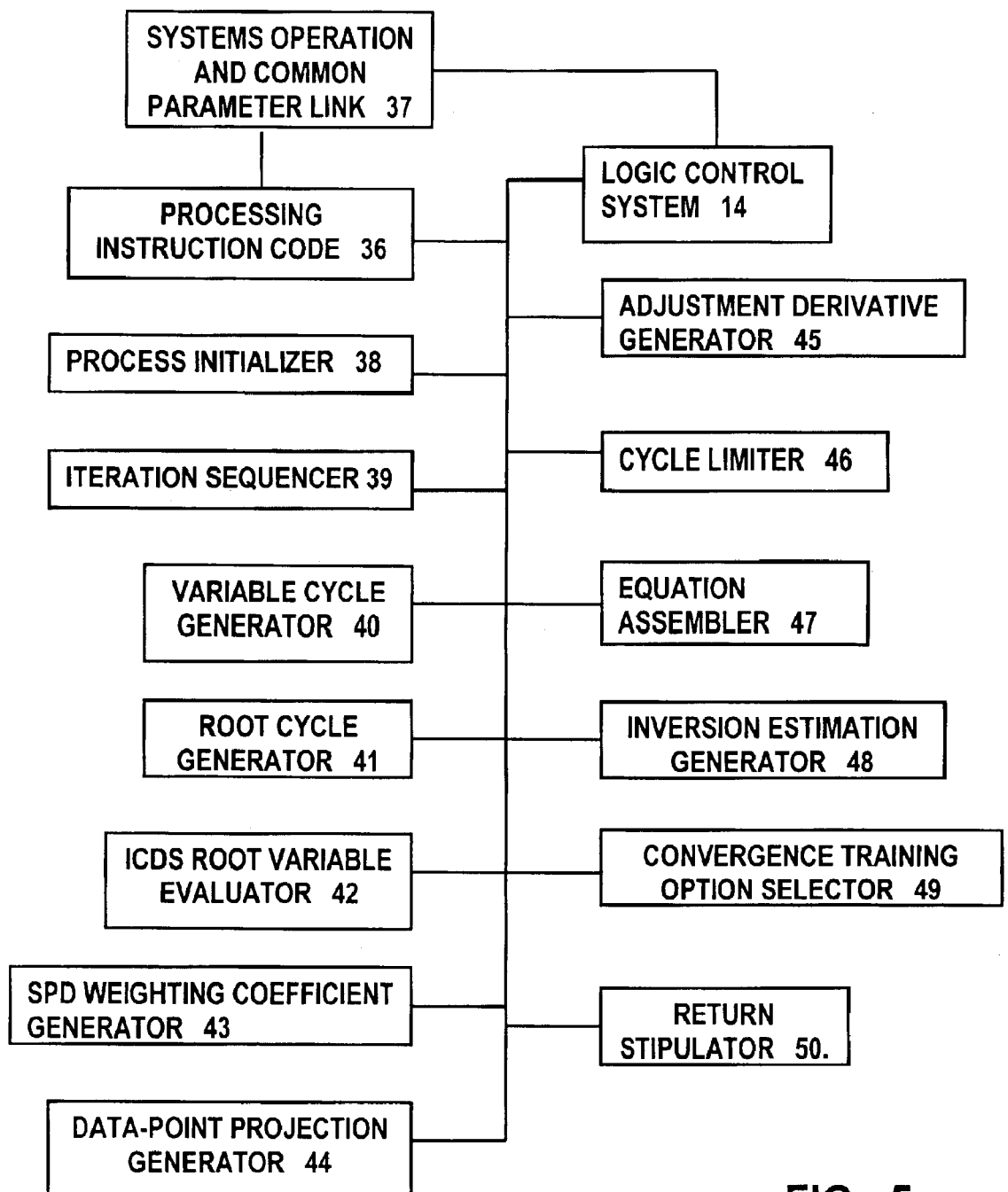
FIG. 5 depicts an ICDS data processor as including processing instruction code which is interfaced by a systems operation and common parameter link and functional components which are activated in accordance with the present invention.

Now referring to FIG. 5, in accordance with the present invention, an ICDS data processor 20 is a data processor which provides means for accessing and processing information whereby fitting approximations may be generated in correspondence with data-point projections, said data-point projections being considered in correspondence with ICDS.

FIG. 5 depicts an exemplary ICDS data processor as including processing instruction code 36 which is interfaced by a systems operation and common parameter link 37 to a logic control system 14 for providing command control of functional components including: a process initializer 38, an iteration sequencer 39, a variable cycle generator 40, a root cycle generator 41, an ICDS root variable evaluator 42, a SPD weighting coefficient generator 43, a data-point projection generator 44, an adjustment derivative generator 45, a cycle limiter 46, an equation assembler 47, an inversion estimation generator 48 a convergence training option selector 49, and a return stipulator 50.

The process initializer 38 allocates representation of parameters, provides reduction option selection, and provides selected option verification and/or alteration.

The iteration sequencer 39 sets and resets iteration parameters, validates reduction, normalizes estimates, indicates reduction selection, and initiates iteration. Prior to each initiation the iteration sequencer may check for interrupt.

Upon encountering interrupt the iteration sequencer may service the interrupt and resume iteration or transfer the logic sequencing along with the interrupt instructions back to the process initializer 38.

The variable cycle generator 40 provides for cycling through each of the considered independent variable degrees of freedom and correspondingly provides for the summing of addends over one or more variable degrees of freedom during said data processing, said addends being generated in correspondence with respective ICDS.

The root cycle generator 41 provides for cycling through one or more considered root solutions corresponding to each simultaneously considered variable degree of freedom and correspondingly provides for the summing of addends over one or more root solutions for one or more simultaneously considered variable degrees of freedom during said data processing, said addends being generated in correspondence with respective ICDS. In accordance with the present invention, the root cycle generator need not necessarily be included if projected root solution elements are generated in one to one correspondence with respective data-point measurements. In accordance with the present invention said projected root solution elements should be rendered in one to one correspondence with respective said data-point measurements unless roots of multiple-valued functions are sufficiently grouped to not clearly establish said one to one correspondence.

An ICDS root variable evaluator 42, is an application adapted user supplied subroutine, a processing device or alternately dedicated system which establishes functional relationships and inverse function relationships for evaluating root solution elements of respective ICDS. At least one form for rendering a root variable evaluator is exemplified by the rendered subroutine FUN which is included in Appendix A.

The SPD weighting coefficient generator 43 is implemented to provide the option for weighting addends in correspondence with a plurality of ICDS for rendering at least one form of ICDS processing. At least one form for rendering instruction code for providing a selection of weighting coefficients is exemplified by the rendered subroutine SPDW which is included in Appendix A.

The data-point projection generator 44 provides for the evaluating or parametric representing of data-point projections in correspondence with each of the respectively considered ICDS, and correspondingly provides for implementing the option of rendering sums of weighted said data-point projections in correspondence with one or more considered variable degrees of freedom and each respectively determined and correspondingly included root solution.

The adjustment derivative generator 45 is an application adapted user supplied subroutine, a processing device, or an alternately dedicated system which implements user supplied application-related information to provide function derivatives taken with respect to adjustment parameters for implementing subsequent inversion processing. At least one form for rendering specified function derivatives with respect to adjustment parameters is exemplified by the rendered subroutine DXDP which is included in Appendix A.

The optional cycle limiter 46 provides the option of limiting the reduction cycles to less than the total number of degrees of freedom for implementing options of rendering reduced or single component ICDS processing in accordance with the present invention, or for alternately implementing the reduction processing to provide typical forms including simple least-squares analysis, and single component residual displacement processing.

The equation assembler 47 renders provided data along with function definitions for implementing data inversions.

In accordance with the present invention, the rendering of data inversions may be implemented by alternate optimizing methods. For example, the processing instruction code of the ICDSP subroutine as included in Appendix A provides for the evaluating of corrections to successive estimates of included fitting parameters as an example of a method for optimizing likelihood for said rendering data inversions. Other optimization methods and techniques may include rendering gradient search, solving systems of equations, inverting matrices, rendering global or local search techniques, or implementing any one of several available numeric optimization packages.

The inversion estimation generator 48 implements at least one optimizing method for rendering data inversions. In accordance with the present invention, it may also include means for rendering alternate reduction options such as:
1. rendering inversions with disregard for measurement bias,
2. rendering inversions which represent adjustment parameter removal of measurement bias from maximum likelihood estimating,
3. rendering inversions which represent bias as evaluated in correspondence with close proximity offset estimates,
4. rendering inversions which represent bias first order evaluations being evaluated in correspondence with close proximity offset estimates.

The convergence training option selector 49 allows for parameter modification and repeat processing in order to train specific convergence in correspondence with known or considered restraints. In accordance with the present invention, the convergence training option selector may alternately provide access to a characteristic form simulation generator for rendering characteristic dispersion simulations.

The return stipulator 50 transfers the logic sequence control back to the instructions of the ICDS system process manager.

Figure 6:
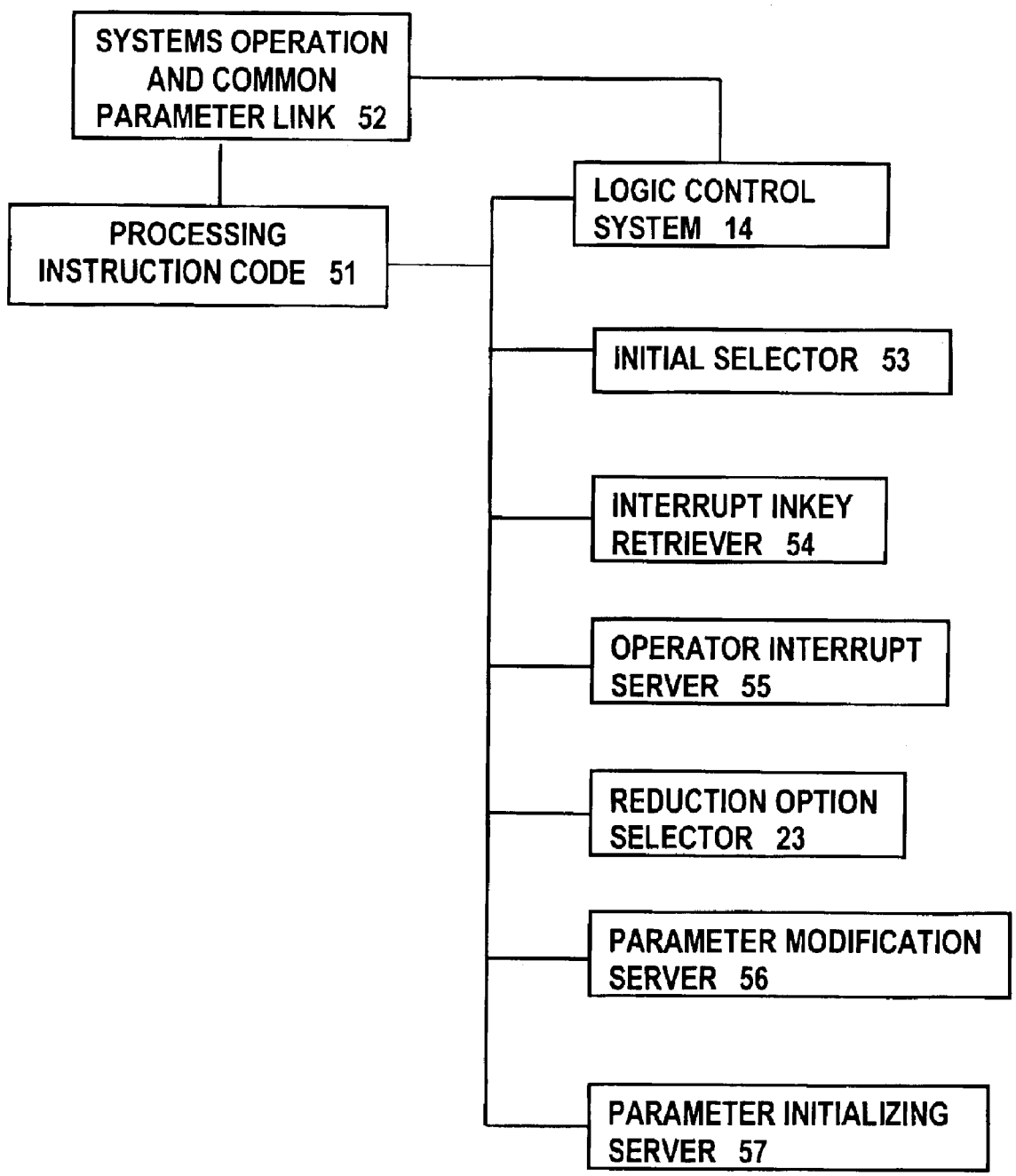
FIG. 6 depicts a processor interrupt and a respective interrupt service as including processing instruction code which is interfaced by a systems operation and common parameter link and functional components which are activated in accordance with the present invention.

Referring to FIG. 6, the processor interrupt 22 allows for operator interrupt during inversion processing to modify parameters and option selections.

FIG. 6 depicts an exemplary processor interrupt and a respective interrupt service as including processing instruction code 51 which is interfaced by a systems operation and common parameter link 52 to a logic control system 14 for providing command control of functional components including: an initial selector 53, an interrupt inkey retriever 54, an operator interrupt server 55, a reduction option selector 23, a parameter modification server 56, a parameter initializing server 57.

The initial selector 53 initially displays the current reduction setup including initial estimates and current option selections and provides a variety of selection choices such as portraying the inversion as rendered by the initial estimates, implementing an initial parameter estimator for generating alternate initial estimates, marking selected initial estimates as constant or rendered for evaluation, adjusting precision or standard deviation reference estimates, entering or modifying initial estimate values, continuing execution of the inversion, or aborting execution.

The interrupt inkey retriever 54 retrieves stroke instructions from the keyboard.

The operator interrupt server 55 responds to stroke instructions by resetting the iteration count and/or channeling command to the reduction option selector 23, the parameter modification server 56, or the parameter initializing server 57 and/or then continuing, aborting, or transferring control back to the initial selector 53.

The parameter modification server 56 provides for parameter modifications or updates, and/or renders parameters to be evaluated or held constant during the pending reduction.

The parameter initializing server 57 provides for updating estimates, resetting initial estimates, modifying reduction options, and/or continuing reduction processing.

Figure 7:
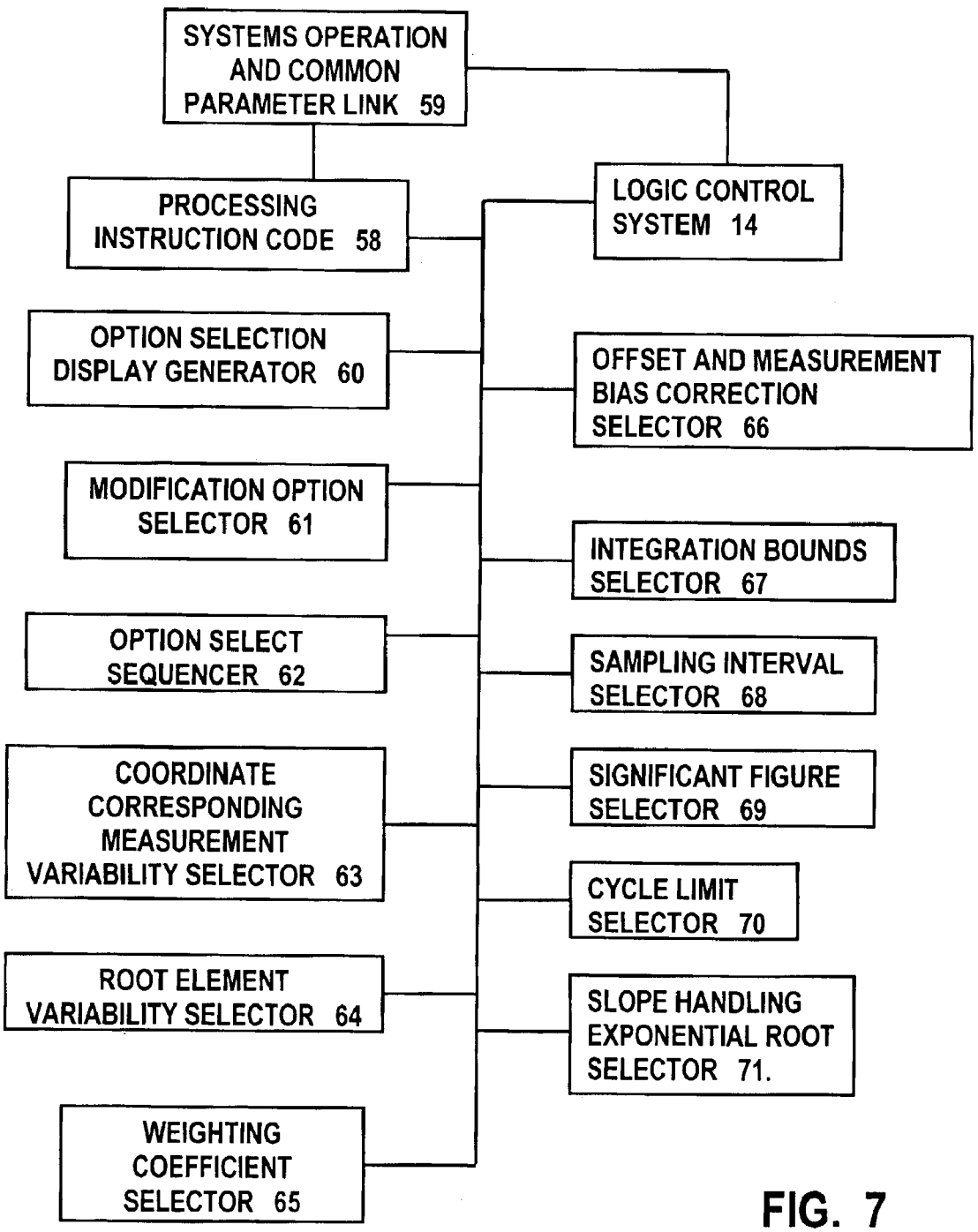
FIG. 7 depicts a reduction option selector as including processing instruction code which is interfaced by a systems operation and common parameter link and functional components which are activated in accordance with the present invention.

Referring to FIG. 7 the reduction option selector 23 provides for interactive option selection both prior to and during inversion processing. FIG. 7 depicts an exemplary reduction option selector as including processing instruction code 58 which is interfaced by a systems operation and common parameter link 59 to a logic control system 14 for providing command control of functional components including: an option selection display generator 60, a modification option selector 61, an option select sequencer 62, a coordinate corresponding measurement variability selector 63, a root element variability selector 64, a weighting coefficient selector 65, an offset and measurement bias correction selector 66 an integration bounds selector 67, a sampling interval selector 68, a significant figure selector 69, a cycle limit selector 70, a slope-handling exponential root selector 71.

The option selection display generator 60, provides a display of options for interactive selection.

The modification option selector 61 provides a query for requesting modifications.

The option select sequencer 62 provides for cycling through specific modification queries.

The coordinate corresponding measurement variability selector 63 provides for selecting a form for rendering measurement variability. Selections for rendering measurement variability which are provided by the exemplary command code of Appendix A include:
1. rendering simple linear dispersion coupling,
2. generating representation for bi-coupled dispersions as a function of associated probability density,
3. including root element measurement variances as a function of associated probability density,
4. directly including root element measurement variance along with rendered dispersions,
5. excluding root element measurement variance from rendered dispersions,
6. directly equating variability to respective variance,
7setting variability to effective variance,
8setting variability for nonlinear effective variance,
9. setting variability to zero,
10. representing variability as one,
respective dispersion coupling being based upon the data-related order of antecedent measurements as supplied along with accompanying data. (Item numbering in this disclosure is not intended to correspond to the option selections provided by the command code of Appendix A.)

The root element variability selector 64, provides for selecting a form for rendering root element variability. Selections for rendering said root element variability which are provided by the exemplary command code of Appendix A include:
1. default settings which correspond to the complement of selected measurement variability,
2. the complement of simple linearly-related measurement variability,
3. the complement of bi-coupled measurement variability,
4. the complement of simple linearly-related measurement variance,
5. the complement of bi-coupled measurement variance,
6. the root element measurement variability,
7. the root element variance,
8. linear effective variability,
9. nonlinear effective variability.

The weighting coefficient selector 65, provides for selecting a form for rendering SPD weighting coefficients. Selections for rendering SPD weighting coefficients which are provided by the exemplary command code of Appendix A include:
1. no weighting.
2. simple slope handling weighting,
3. weighting on selected root element variability,
4. simple slope handling weighting being divided by selected root element variability,
5. simple slope handling weighting being divided by mean normalized variability with the selected root element variability isolated,
6. simple slope handling weighting being divided by coordinate corresponding mean normalized variability without selected root element variability isolation,
7. simple slope handling weighting with variables normalized on respective variability,
8. weighting on selected root element variability with variables normalized on respective variability,
9. simple slope handling weighting being divided by selected root element variability with variables normalized on respective variability,
10. simple slope handling weighting being divided by mean normalized variability with the selected root element variability isolated with variables normalized on respective variability,
11. simple slope handling weighting being divided by coordinate corresponding mean normalized variability without selected root element variability isolation, with variables normalized on respective variability,
12. simple slope handling weighting with variables normalized on respective variability with heterogeneous enhancements,
13. weighting on selected root element variability with variables normalized on respective variability with heterogeneous enhancements,
14. simple slope handling weighting being divided by selected root element variability with variables normalized on respective variability with heterogeneous enhancements,
15. simple slope handling weighting being divided by mean normalized variability with the selected root element variability isolated with variables normalized on respective variability with heterogeneous enhancements.
16. simple slope handling weighting being divided by coordinate corresponding mean normalized variability without selected root element variability isolation, with variables normalized on respective variability with heterogeneous enhancements.

The respectively rendered form for coordinate corresponding measurement variability is determined by the coordinate corresponding measurement variability selector 63, and the respectively rendered form for the root element variability. The offset and measurement bias correction selector 66 as rendered in exemplary command code of Appendix A provides for either ignoring correcting for offset and measurement bias or including bias and offset correction adjustments in the likelihood estimator.

The integration bounds selector 67 as rendered in exemplary command code of Appendix A provides an option for setting the limits of digital integrations as implemented in generating approximations for coupled dispersion variability.

The sampling interval selector 68 as rendered in exemplary command code of Appendix A provides an option for setting the number of interval samples to be provided for digital integrating of the coupled dispersion accommodating variability.

A significant figure selector 69 as rendered in exemplary command code of Appendix A provides an option for setting the desired number of significant figures to be considered in rendering convergence.

A cycle limit selector 70 as rendered in exemplary command code of Appendix A provides an option for setting the number of successive iteration cycles to be allowed between improved iteration estimates.

A slope-handling exponential root selector 71 as rendered in the exemplary command code of Appendix A provides an option for setting the slope-handling exponential root. Said root should normally be set equal to the number of simultaneously considered degrees of freedom, however in accordance with the present invention variations in said root may be alternately considered and correspondingly implemented in rendering respective form for normalizing coefficients.

Figure 8:
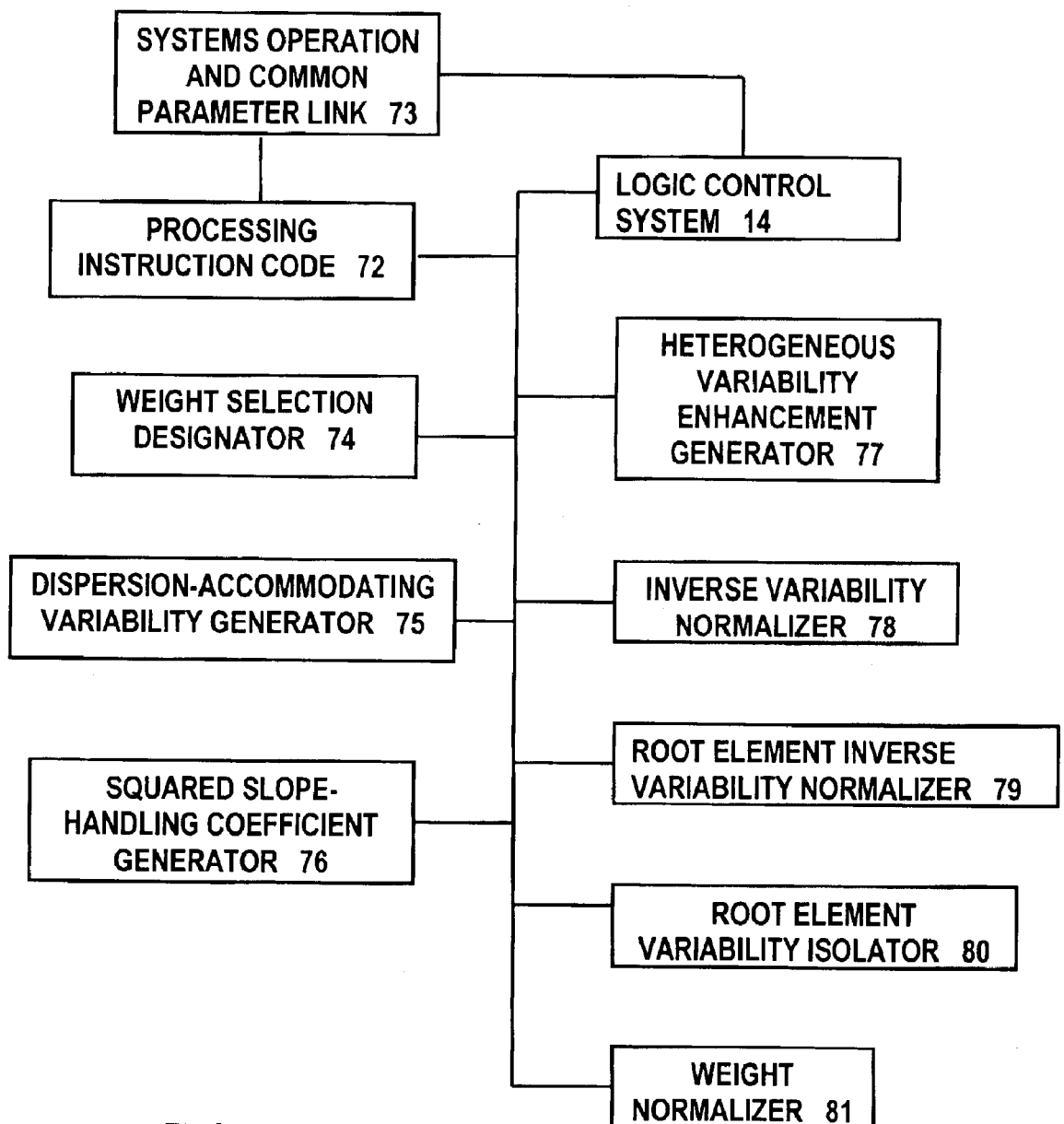
FIG. 8 depicts a SPD weighting coefficient generator as including processing instruction code which is interfaced by a systems operation and common parameter link and functional components which are activated in accordance with the present invention.

Referring to FIG. 8, in accordance with the present invention, SPD weighting is a form of addend weighting which is implemented in rendering data inversions in correspondence with ICDS. Said SPD weighting is assumed to correspond in direct proportion to the ratio of the square of at least some form of addend normalizing coefficients divided by mean values for at least some form of respectively normalized variability.

In accordance with the preferred embodiment of the present invention, SPD weighting may be rendered in the form of complementary weighting coefficients and/or alternately rendered in proportion to the square of at least one form of slope-handling coefficients.

In accordance with the present invention, a SPD weighting coefficient generator provides means for the generating of at least one form of SPD weighting coefficient. FIG. 8 depicts an exemplary SPD weighting coefficient generator 43 as including processing instruction code 72 which is interfaced by a systems operation and common parameter link 73 to a logic control system 14 for providing command control of functional components including: a weight selection designator 74, a dispersion-accommodating variability generator 75, a squared slope-handling coefficient generator 76, a heterogeneous variability enhancement generator 77, an inverse variability normalizer 78, a root element inverse variability normalizer 79, a root element variability isolator 80, a weight normalizer 81.

The weight selection designator 74 directs the weighting coefficient generator to render a selected form for weighting coefficients.

The dispersion-accommodating variability generator 75 provides for the generating of dispersion-accommodating variability in accordance with the present invention and may also provide for the selecting and generating of one or more alternate choices for the rendering of measurement variability.

The squared slope-handling coefficient generator 76 renders squared slope-handling coefficients as considered in correspondence with each considered inversion-conforming data set. said squared slope-handling coefficients being rendered or approximated in accordance with the present invention as equal to or in proportion to the inverse of a root of the square of the product of differential change of the determined element variable(s) taken with respect to orthogonal element variable(s) and evaluated in correspondence with the respective measurement(s) or provided measure(s) of said orthogonal element variable(s) of said inversion-conforming data set.

The heterogeneous variability enhancement generator 77 provides option and means to generate and implement coefficients to correct for the effects of functional variations in variability.

The inverse variability normalizer 78 provides for implementing coordinate normalization in the generating of normalizing coefficients by dividing included variables by their respective variability. For applications which may simply render variability as represented by the square of precision uncertainty, Said inverse variability normalizer may comprise a Discriminate Reduction Data Processor to implement Discriminate Reduction Data Processing for generating variant precision coordinate normalizing proportions as considered with respect to inversions which render minimum values for parametric expressions which may be assumed to represent sums of squares of coordinate-normalized datum variances (ref. U.S. Pat. Nos. 5,619,432; 5,652,713; and 5,884,245).

The root element inverse variability normalizer 79 provides for including the slope-handling coefficient multiplied by the inverse of selected root element variability to render respective weighting.

The root element variability isolator 80 provides for the isolating and rendering of included root element variability as a complement of orthogonal measurement variabilities while rendering respective forms for complementary weighting coefficients.

The weight normalizer 81 provides for generating a mean normalized variability as a normalizing divisor and respectively normalizing considered normalizing coefficients to render form for correspondingly specified weighting coefficients.

Figure 9:
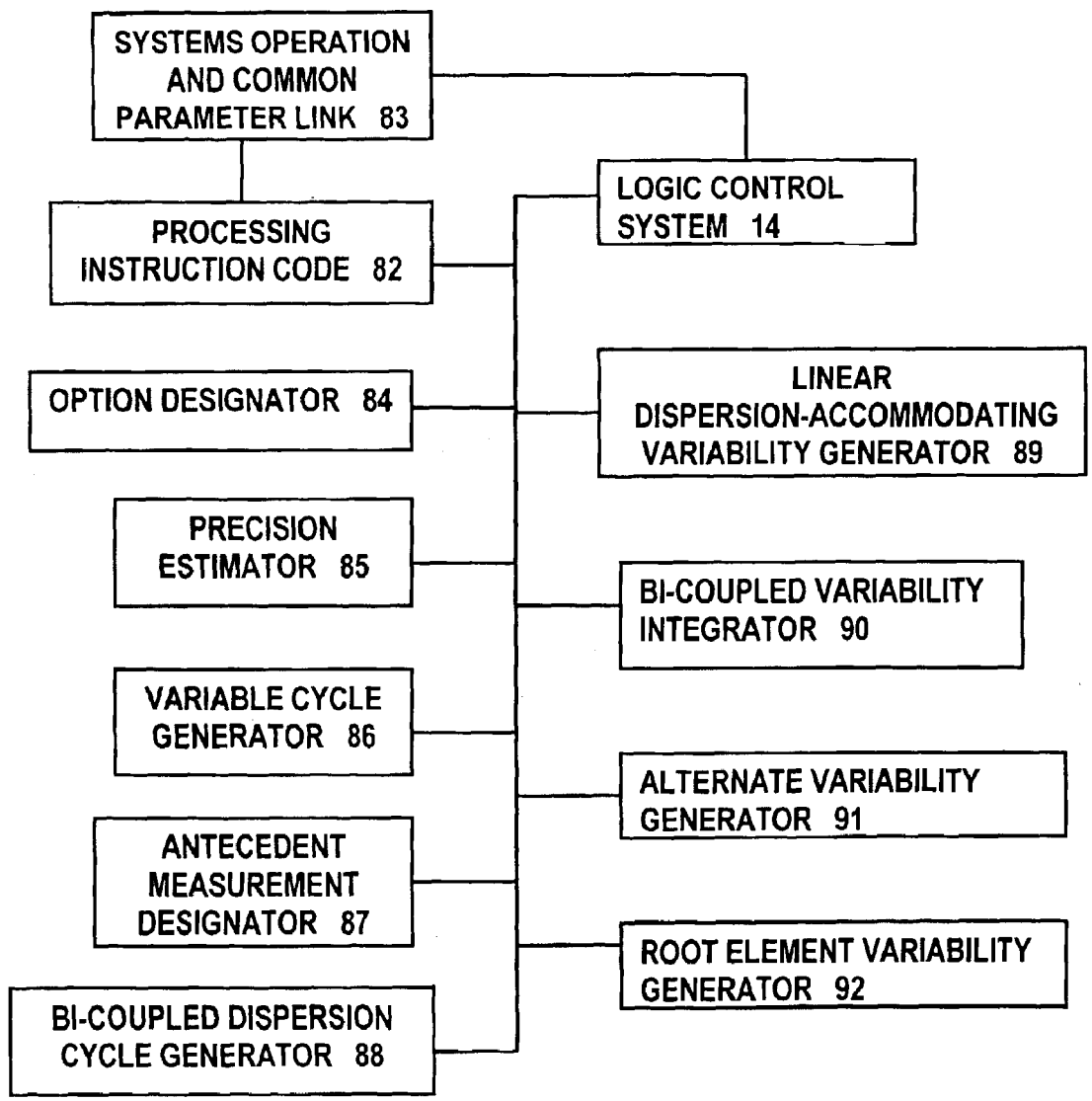
FIG. 9 depicts a dispersion-accommodating variability generator as including processing instruction which is interfaced by a systems operation and common parameter link and functional components which are activated in accordance with the present invention.

Referring to FIG. 9, in accordance with the present invention a measure of the variability of an individual measurement event may be referred to as its variance, however when the outcome of said measurement event is dependent upon the dispersion of prior (or antecedent) measurement events, the variability of said outcome may be assumed to reflect the pertinent antecedent measurement dispersions. In accordance with the present invention the variability in the outcome of a measurement event will include any considered pertinent antecedent measurement dispersions. Alternately, in accordance with the present invention, if and when the outcome of a measurement event can be considered to be independent of prior measurements, said outcome may be considered as statistically independent of antecedent measurement dispersions and the corresponding variability of such statistically independent outcomes may be considered as equivalent to the respective measurement variance. In accordance with the present invention, a measurement event may be either dependent upon, or independent of antecedent measurement dispersions. In accordance with the present invention a dispersion-accommodating variability generator is equipped to provided representation of measurement outcome variability to include any considered pertinent antecedent measurement dispersions, with implication that if no antecedent measurement dispersions are to be included or considered pertinent, said measurement outcome variability will be alternately rendered to represent only the considered variations in the respective measurements.

FIG. 9 depicts a dispersion-accommodating variability generator 75 as including processing instruction code 82 which is interfaced by a systems operation and common parameter link 83 to a logic control system 14 for providing command control of functional components including: an option designator 84, a precision estimator 85, a variable cycle generator 86, an antecedent measurement designator 87, a bi-coupled dispersion cycle generator 88, a linear dispersion-accommodating variability generator 89, a bi-coupled variability integrator 90, an alternate variability generator 91, a root element variability generator 92.

The option designator 84 coordinates the rendering of considered variability in correspondence with represented precision, specified approximative form, and respectively selected options.

The precision estimator 85 provides for rendering representation of measurement precision in correspondence with coordinate locations.

The variable cycle generator 86 provides for cycling through elements of ICDS while generating respective component measurement variability. In accordance with the present invention, it may also provide for rendering an additional cycle for implementing the generating of the determined root solution element variability.

The antecedent measurement designator 87 coordinates the rendering of dispersion-accommodating variability in correspondence with the respective order of consecutively dependent measurements.

The bi-coupled dispersion cycle generator 88 provides for cycling through orthogonal components of dispersion for including orthogonal variable dispersions in generating dispersion-accommodating variabilities and complements of orthogonal variabilities.

The linear dispersion-accommodating variability generator 89 provides the option of generating simple linear dispersion-accommodating variability.

The bi-coupled variability integrator 90 provides for the integration of bi-coupled components of dispersion-accommodating variability and bi-coupled complements of orthogonal measurement variability.

The alternate variability generator 91 provides for rendering alternate options for replacing or representing forms of variability.

The root element variability generator 92 provides for rendering root solution element variability of a specified form.

Figure 10:
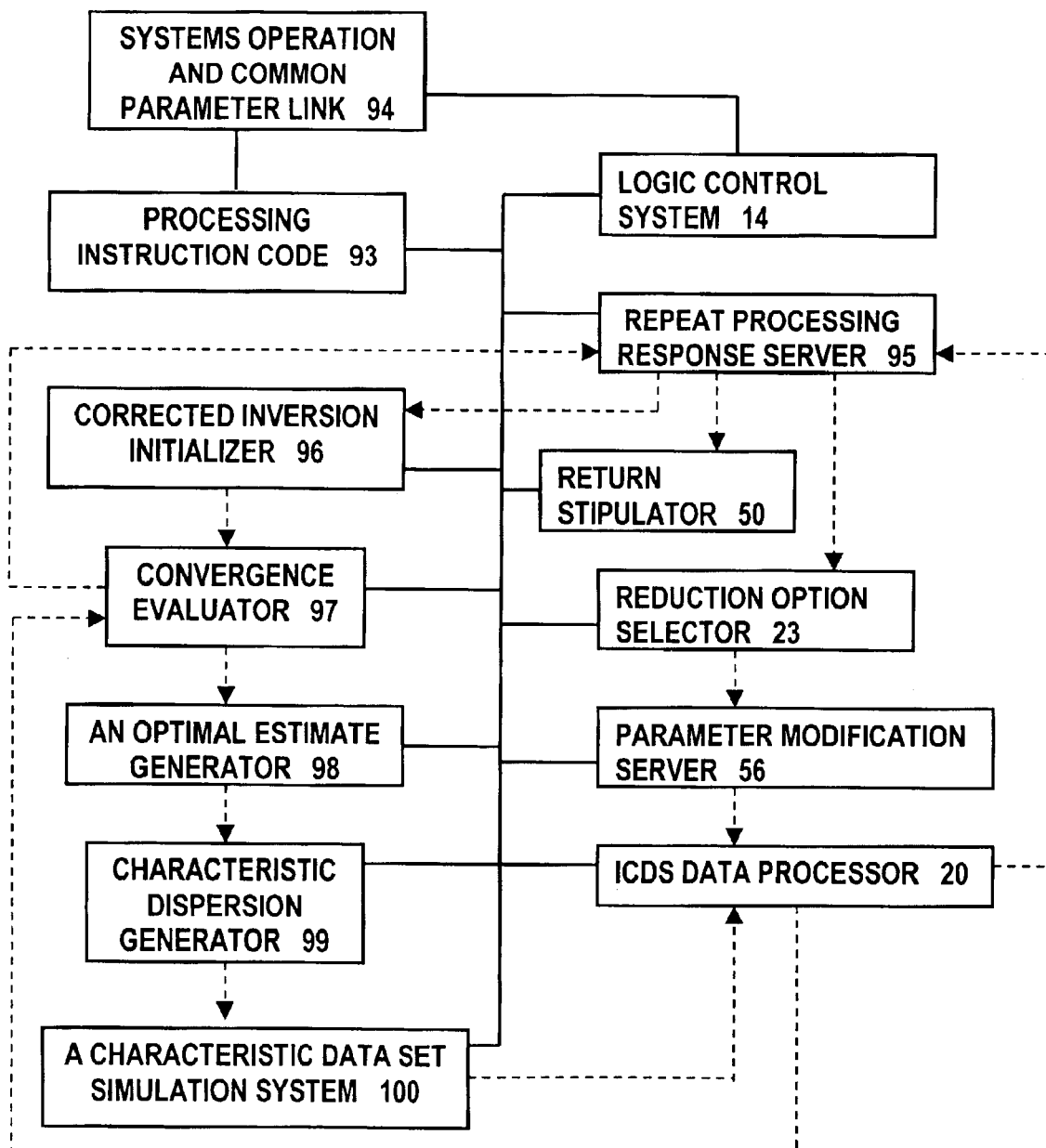
FIG. 10 depicts an example of a convergence training option selector as including processing instruction which is interfaced by a systems operation and common parameter link and functional components which are activated in accordance with the present invention.

Referring now to FIG. 10 the convergence training option selector 49 allows for parameter modification and repeat processing in order to train specific convergence in correspondence with known or characterized restraints.

Also, in accordance with the present invention, Said convergence training option selector may be alternately implemented to render corrections to considered data inversions in correspondence with characteristic dispersion models including previously mentioned characteristic form iterations and renditions of alternate inversions correction techniques being related to characterized dispersions.

FIG. 10 depicts an example of a convergence training option selector 49 as including processing instruction code 93 which is interfaced by a systems operation and common parameter link 94 to a logic control system 14 for providing command control of functional components including a repeat processing response server 95 a return stipulator 50, a reduction option selector 23, a parameter modification server 56, and the ICDS data processor 20. The repeat processing response server 95 provides response to operator request for repeat data processing. It also provides access to the reduction option selector 23, and parameter modification server 56 to allow selection of modifications for repeat processing.

In addition, the convergence training option selector 49 may also provide for the rendering of inversion correction techniques being related to characterized dispersions by including interface to: a corrected inversion initializer 96, a convergence evaluator 97, an optimal estimate generator 98, a characteristic dispersion generator 99, and a characteristic data set simulation system 100.

In accordance with the present invention, the herein considered inversion correction technique being related to characterized dispersions is represented by repetitive inversions of simulated data of characteristic form which are processed to generate inversion parameters equal to or nearly equal to those obtained by similarly processing actual data. Said simulated data of characteristic form is generated by adding characteristic representations of error deviations to successively corrected inversion representations. Said corrected inversion representations are rendered in correspondence with a considered data inversion by:

1. representing an initial estimate of said correction in correspondence with a respectively considered approximating relationship of an appropriate parametric approximative form,
2. rendering said simulations by combining successive estimates of said correction with a characteristic representation of error deviations,
3. rendering inversions of said successive simulations by implementing the same processing techniques for successively processing said simulations that were used in processing to generate said considered data inversion,
4. rendering said successive estimates of said correction by combining prior said estimates with said considered data inversion, and with respective inversions of said successive simulations, and
5. implementing and effecting at least some form of successive estimate approximating and evaluating so as to render inversions of said successive simulations to more closely replicate said considered data inversion.

In accordance with the present invention inversions of said successive simulations may be verified as closely replicating said considered data inversion by direct comparison of said considered data inversion with successive inversions of said successive simulations, by alternate approximation and evaluation methods such as comparing successive approximations of said corrections, or by a combination of various evaluating techniques. For example, an alternately defined sequence of steps for rendering corrected inversions as related to characterized dispersions and characteristic form iterations has been disclosed in a previous invention of the present inventor to account for errors related to higher order nonlinear affects, said characteristic form iterations being rendered by a data processing system configured for implementing at least one form of inverse deviation variation weighting for representing the weight of respective function related deviations, wherein initial estimates are rendered as results from considered or preliminary data inversions. In accordance with U.S. Pat. No. 6,181,976 B1, considered characteristic form iterations would include the following steps:

1. storing initial estimates to provide both initial estimates and current approximations;
2. utilizing the represented current approximations to generate successive data simulations as characterized by the represented fitting function and a represented error distribution of assumed characteristic form;
3. storing the current approximations to represent stored values for previous approximations;
4. generating simulated estimates by processing said successive data simulations utilizing the same processing techniques that were implemented in generating the initial estimates;

5. computing new values for the current approximations as represented by the original initial estimates minus the simulated estimates plus the stored values for the previous approximations;
6. checking convergence by comparing the current approximations to said stored values for previous approximations; and
7. repeating steps 2 through 6 until a convergence criteria is satisfied.

In accordance with the present invention, said initial estimates may be represented by said considered data inversion, or may be alternately rendered in consideration of said data inversion. Also, in accordance with the present invention, alternate techniques may be implemented in order to check for respective convergence. For example, by comparing inversions of successive simulations to the originally considered inversion, step number 3 (i.e. storing the current approximations to represent stored values for previous approximations) may be omitted. Alternately, it may be useful to store previous renditions of successive estimates and/or simulations in order to further enhance the rendering of successive estimates.

Still referring to FIG. 10, the corrected inversion initializer 96, allows the operator to select implementing corrections. It also provides for storing the originally rendered inversion parameters; and allocating storage for retaining current correction estimates, initializing the allocated reduction storage, and providing initial estimates to the current inversion parameters storage locations.

The convergence evaluator 97 compares subsequently rendered reduction storage (as initialized or rendered with recent inversion results) to previously stored original inversion parameter values, and either terminates the iteration and transfers operations back to the repeat processing response server 95 or transfers control of processing to the optimal estimate generator 98.

The optimal estimate generator 98 generates new estimates for the current inversion parameters as represented by the originally rendered inversion parameters plus the inversion parameters which are stored in the current inversion parameters location minus said most recent inversion results.

The characteristic dispersion generator 99 provides or generates coordinate related error deviations and respectively associated variability as would be characteristic of the currently considered data.

The characteristic data set simulation system 100 generates a set of function-conforming data points which correspond to said current correction for inversion parameters and generates a characteristic data simulation by including said coordinate related error deviations.

The characteristic data simulation is then rendered as a data, inversion by operations of the ICDS data processor 20, and control is returned to the convergence evaluator 97 where the iteration convergence criteria is evaluated for each successive approximation.

Referring now to the compact disk appendix APPENDIX A.txt and APPENDIX B.txt, respectively including Appendices A and B; Appendix A provides an example of command code for rendering forms of ICDS processing by means which include implementing digital circuitry. Appendix B presents sample listings which represent simulated data-point sets that may be transferred to respective system accessible data files rendered in digital form as provided data to demonstrate examples of inversion by application of said command code of Appendix A. Said Appendix B includes listings for renderings all or any combination of the following simulated data files:

1. \InvDat\Linear1.fit, which corresponds to evaluated points of the three-dimensional linear function, $$x_1 = 2x_2 + 3x_3 - 4 \tag{60}$$

(The provided data of this first linear set is simulated as error-free, and corresponding inversions should provide exact representation of Equation 60 as considered within the computational accuracy of the command code and respective processing system.);
2. \InvDat\Linear2.fit, which corresponds to evaluated points of Equation 60 with random positive and negative values added to the evaluated coordinates to simulate statistically independent error affected data;
3. \InvDat\Linear3.fit, which corresponds to evaluated points of Equation 60 with random positive and negative values successively added and included in subsequently evaluating coordinates to simulate error affected data with antecedent measurement dispersion dependence;
4. \InvDat\Linear4.fit, which corresponds to evaluated points of Equation 60 with determined positive and negative values added to the evaluated coordinates to render simulated data to include uniform symmetrically applied deviations;
5. \InvDat\Linear5.fit, which corresponds to evaluated points of Equation 60 with determined positive and negative values added to the evaluated coordinates, said values corresponding in inverse proportion to the respective term coefficient in order to simulate a symmetrical, non-bias scatter in the provided data points (The provided data of this fifth linear set is simulated to artificially exemplify homogeneous, statistically independent, non-skewed, bias-free, error distributions. Respective inversions of this fifth data set by an appropriately implemented ICDS processing system should be able to provide exact representation of Equation 60 as considered within the computational accuracy of the command code and said processing system.);
6. \InvDat\Poly1.fit, which corresponds to evaluated points of the nonlinear function, $$x_1 = 2x_2^2 + 3x_3^3 - 4 \tag{61}$$

(The provided data of this first nonlinear set is simulated as error-free, and corresponding inversions should provide exact representation of Equation 61 as considered within the computational accuracy of the command code and respective processing system.);
7. \InvDat\Poly2.fit, which corresponds to evaluated points of Equation 61 with random positive and negative values added to the evaluated coordinates to simulate nonlinear statistically independent error affected data;
8. \InvDat\Poly3.fit, which corresponds to evaluated points of Equation 61 with random positive and negative values successively added and included in subsequently evaluating coordinates to simulate error affected data with antecedent measurement dispersion dependence;
9. \InvDat\Poly4.fit, which corresponds to evaluated points of Equation 61 with determined positive and negative values added to the evaluated coordinates to render simulated data to include uniform symmetrically applied deviations.

Referring back to Appendix A, in accordance with the present invention, ICDS processing is not necessarily limited to digital reduction processes. ICDS processing systems may represent analog, digital, or even mechanical techniques in rendering component parts, and data retrieval systems may implement either real time data acquisition or retrieval of samples from memory, or both real time data acquisition and retrieval of samples from memory for rendering corresponding data inversions.

Appendix A provides exemplary command code for implementing at least one form of ICDS processing. The included GETDATA subroutine provides for the retrieval of data samples from memory by implementing DOS QBASIC commands to:
1. select a data file,
2. retrieve information regarding the number of available data points and the corresponding number of degrees of freedom,
3. allocate digital memory for data storage and manipulation,
4. retrieve information regarding the precision of measurements,
5. retrieve information to establish the order of orthogonal measurements for rendering dispersion-accommodating variability, and
6. retrieve coordinate-related data as provided for the respective inversion.

The START subroutine initiates reduction processing by:
1. providing or requesting selection of a reduction type index,
2. establishing default reduction options,
3. setting evaluation designators to designate which adjustment parameters are to be preset and which are to be evaluated,
4. establishing which data-point projections are to be included in the reduction, or whether single component residual displacements processing might be alternately implemented,
5. establishing an orthogonal measurement variability selection,
6. establishing the ICDS root element variability selection,
7. establishing a weight factor selection,
8. setting the slope handling exponential root, and
9. setting default values for initial parameter estimates. In accordance with the present invention, said subroutine START may be alternately supplied or respectively modified to render appropriate initial estimates, designator settings, or default option selections in correspondence with the provided data and preferred approximative form of the data being processed.

The ICDSP subroutine effects the reduction processing by:
1. displaying the selected options and initial estimates and allowing interactive modifications and graphic display,
2. providing for the input of nested parameter estimates,
3. providing for the input or evaluation of coefficient estimates,
4. generating a respective inversion in correspondence with function definitions and derivatives which are rendered for a specific application in accordance with command code of subroutines FUN, DPDX, and DXDX,
5. cycling through interactive modifications and repeating inversions with updated estimates.

The subroutines FUN, DPDX, and DXDX as included in Appendix A render function definitions, inverse function definitions, and respective derivatives in correspondence with Equations 59 and 60 as command code for specified inversion applications. In accordance with the present invention, said subroutines FUN, DPDX, and DXDX may be alternately supplied or respectively modified to render appropriate function definitions and derivatives in correspondence with the preferred approximative form of any data being processed.

The PREC subroutine provides local measurement precision as related to a specific reference value which is provided by the GETDATA subroutine. In accordance with the present invention, said subroutine PREC may be alternately supplied or respectively modified to render appropriate homogeneous or heterogeneous precision estimates in correspondence with said reference value for the specific set of data samples being processed.

The LnPROB subroutine provides the log of the dispersion distribution functions for rendering dispersion-accommodating variability. In accordance with the present invention, said subroutine LnPROB may be alternately supplied or respectively modified to render appropriate distribution functions in correspondence the specific set of data samples being processed.

The VAR subroutine provides for the generating of a variety of alternate forms for rendering variability and complements of variability. It also includes command code for rendering integrations to generate bi-coupled forms of dispersion-accommodating variability and respective variability complements.

The SPDW subroutine provides for the generating of a variety of weighting coefficients including forms of complementary weighting and slope-handling weighting for rendering respective SPD weighting or for rendering weighting in correspondence with alternately considered reduction procedures.

Other subroutines included in Appendix A are rendered for example to solve matrix equations, and provide graphic display. The PRINT and SHOWFIT subroutines render simplified output data management to illustrate respective inversion outcome. More elaborate systems may be alternately implemented in accordance with the present invention to respectively implement data inversions for specific or general application and for correspondingly generating data inversion representations being respectively rendered in substance.

The example of command code as rendered in Appendix A is not expected to be completely without flaw, however, said command code and included comments along with other descriptive information which is provided in this disclosure is sufficient for one skilled in the art to understand and practice the present invention, whether by digital processing entire or by alternate implementation including analog or mechanical apparatus.

Forms of the present invention are not intended to be limited to the preferred or exemplary embodiments described herein. Advantages and applications of the present invention will be understood from the foregoing specification or practice of the invention, and alternate embodiments will be apparent to those skilled in the art to which the invention relates. Various omissions, modifications and changes to the specification or practice of the invention as disclosed herein may be made by one skilled in the art without departing from the true scope and spirit of the invention which is indicated by the following claims.

What is claimed is:

1. A method for accessing, processing, and representing information whereby a data representation is generated in correspondence with a plurality of data-point projections, each of said data-point projections extending from respective data-point coordinates to intersect an approximating relationship, intersections of said data-point projections with said approximating relationship substantially establishing respective inversion-conforming data sets which comprise projected coordinates for points that conform to a corresponding data inversion at respective said intersections, each of said sets of projected coordinates comprising a respective subset of corresponding said data-point coordinates and at least one parametrically determined variable measure, each said parametrically determined variable measure being determined in correspondence with said approximating relationship and at least one data-point coordinate of said respective subset, said approximating relationship establishing respective correspondence between said at least one data-point coordinate and said at least one parametrically determined variable measure, said approximating relationship being determined in correspondence with a parametric approximative form and at least one parameter estimate, and said data representation being rendered in correspondence with said parametric approximative form and at least one inversion parameter estimate;

said method comprising:

activating means for said accessing, processing, and representing information whereby at least one form of inversion-conforming data sets processing is effectuated, accessing provided data, establishing said parametric approximative form, establishing at least one respective inversion parameter estimate, determining said approximating relationship as related to said parametric approximative form and said at least one respective inversion parameter estimate, and effectuating said at least one form of inversion-conforming data sets processing;

said means for accessing, processing, and representing information comprising:

a control system, and said control system being configured for providing said activating, said effectuating, and said representing information;

said effectuating including implementing and effecting at least one form of parameter estimating in correspondence with said provided data whereby said at least one inversion parameter estimate is generated.

2. A method as in claim 1 wherein said inversion-conforming data sets processing includes the summing together of at least some addends in correspondence with each of at least two variable degrees of freedom, said method including said summing, said at least some addends being generated in respective correspondence with a plurality of approximation-conforming data sets, and at least two of said plurality of approximation-conforming data sets substantially representing respective intersections of at least two mutually orthogonal data-point projections with said approximating relationship in correspondence with said provided data and said at least two variable degrees of freedom.

3. A method as in claim 1 wherein said activating includes activating means for rendering at least one correction to a considered data inversion, said correction being rendered in correspondence with said considered data inversion and successive simulations of data, said method including:

rendering said correction, and incorporating said correction in rendering said data representation;

said correction being generated by:

representing an initial estimate of said correction in correspondence with a respectively considered approximating relationship of corresponding parametric approximative form, rendering said simulations by combining successive estimates of said correction with a characteristic representation of error deviations, rendering inversions of said successive simulations by implementing similar processing techniques for successively processing said simulations that were used in processing to generate said considered data inversion, rendering said successive estimates of said correction by combining prior said estimates with said considered data inversion and with respective inversions of said successive simulations, and implementing and effecting at least some form of successive estimate approximating and thereby rendering inversions of said successive simulations to more closely replicate said considered data inversion.

4. A method as in claim 1 wherein said inversion-conforming data sets processing includes rendering representation of the square of at least one projection normalizing coefficient, said method including said rendering, said square of at least one projection normalizing coefficient being substantially represented in proportion to the square of a respective slope-handling coefficient, said slope-handling coefficient being characterized as inversely proportional to a root of the absolute value of at least one derivative of change in the local measure of said determined variable, said change being considered with respect to corresponding change in the respective measure of at least one considered orthogonal variable, the ratio of said change to said corresponding change being substantially represented in correspondence with said approximating relationship, said slope-handling coefficient being determined at coordinates which substantially correspond to at least two considered elements of a respective inversion-conforming data set, said effectuating including representing an estimated variability, said estimated variability substantially representing possible variations in said determined variable measure as related to a representation of uncertainty in the sampling of at least one element of said respective subset of data-point coordinates, and said representation of uncertainty being considered to characterize variations in possible outcomes of acquisition sampling of a form corresponding to the sampling used in acquiring the respective coordinate sample for said at least one element.

5. A method as in claim 2 wherein said effectuating includes representing an estimated variability, said estimated variability substantially representing possible variations in said determined variable measure as related to a representation of uncertainty in the sampling of at least one element of said respective subset of data-point coordinates, and said representation of uncertainty being considered to characterize variations in possible outcomes of acquisition sampling of a form corresponding to the sampling used in acquiring the respective coordinate sample for said at least one element.

6. A method as in claim 2 wherein said inversion-conforming data sets processing includes rendering the square of at least one projection normalizing coefficient, said method including said rendering, said square of at least one projection normalizing coefficient being substantially represented in proportion to the square of a respective slope-handling coefficient, said slope-handling coefficient being characterized as inversely proportional to a root of the absolute value of at least one derivative of change in the local measure of said determined variable, said change being considered with respect to corresponding change in the respective measure of at least one considered orthogonal variable, the ratio of said change to said corresponding change being substantially represented in correspondence with said approximating relationship, and said slope-handling coefficient being determined at coordinates which substantially correspond to at least two considered elements of a respective inversion-conforming data set.

7. A method as in claim 6 wherein the value of said root substantially corresponds to the number of simultaneously considered variable degrees of freedom.

8. A method as in claim 6 wherein said effectuating includes representing an estimated variability, said estimated variability substantially representing possible variations in said determined variable measure as related to a representation of uncertainty in the sampling of at least one element of said respective subset of data-point coordinates, and said representation of uncertainty being considered to characterize variations in possible outcomes of acquisition sampling of a form corresponding to the sampling used in acquiring the respective coordinate sample for said at least one element.

9. A method as in claim 6 wherein said activating includes activating means for rendering at least one correction to a considered data inversion, said correction being rendered in correspondence with said considered data inversion and successive simulations of data;

said method including:

rendering said correction, and incorporating said correction in rendering said data representation;

said correction being generated by:

representing an initial estimate of said correction in correspondence with a respectively considered approximating relationship of corresponding parametric approximative form, rendering simulations by combining successive estimates of said correction with a characteristic representation of error deviations, rendering inversions of said successive simulations by implementing similar processing techniques for successively processing said simulations that were used in processing to generate said considered data inversion, rendering said successive estimates of said correction by combining prior said estimates with said considered data inversion and with respective inversions of said successive simulations, and implementing and effecting at least some form of successive estimate approximating and thereby rendering inversions of said successive simulations to more closely replicate said considered data inversion.

10. A data processing system comprising:

a control system;

means for accessing, processing, and representing information;

said control system being configured for providing said accessing, processing, and representing information; and said control system being configured for generating at least one data inversion in correspondence with a parametric approximative form;

said processing including:

accessing information, effectuating at least one form of inversion-conforming data sets processing, and rendering at least one data representation in correspondence with said at least one data inversion;

said effectuating including:

accessing provided data, establishing said parametric approximative form, establishing at least one determined form for an approximating relationship as related to said parametric approximative form and at least one respective parameter estimate, and implementing and effecting at least one form of parameter estimating in correspondence with said provided data whereby said at least one data inversion is generated, said data inversion being generated in correspondence with a plurality of data-point projections, each of said data-point projections extending from respective data-point coordinates to intersect said approximating relationship, intersections of said data-point projections with said approximating relationship substantially establishing respective inversion-conforming data sets which comprise projected coordinates for points that conform to said data inversion at respective said intersections, each of said sets of projected coordinates comprising a respective subset of said data-point coordinates and at least one correspondingly determined variable measure, each said determined variable measure being determined in correspondence with said approximating relationship and at least one data-point coordinate of said respective subset, and said approximating relationship establishing respective correspondence between said at least one data-point coordinate and said at least one correspondingly determined variable measure.

11. A data processing system as in claim 10 wherein said inversion-conforming data sets processing includes the summing together of at least some addends in correspondence with each of at least two variable degrees of freedom, said effectuating including representing an estimated variability and rendering said summing, said at least some addends being generated in respective correspondence with a plurality of approximation-conforming data sets, at least two of said plurality of approximation-conforming data sets substantially representing respective intersections of at least two mutually orthogonal data-point projections with said approximating relationship in correspondence with said provided data and said at least two variable degrees of freedom, said estimated variability substantially representing possible variations in said correspondingly determined variable measure as related to a representation of uncertainty in the sampling of at least one element of said respective subset of data-point coordinates, and said representation of uncertainty being considered to characterize variations in possible outcomes of acquisition sampling of a form corresponding to the sampling used in acquiring the respective coordinate sample for said at least one element.

12. A data processing system as in claim 10 wherein said inversion-conforming data sets processing includes summing together of at least some addends in correspondence with each of at least two variable degrees of freedom, said effectuating including representing the square of at least one projection normalizing coefficient and rendering said summing, said at least some addends being generated in respective correspondence with a plurality of approximation-conforming data sets, at least two of said plurality of approximation-conforming data sets substantially representing respective intersections of at least two mutually orthogonal data-point projections with said approximating relationship in correspondence with said provided data and said at least two variable degrees of freedom, said square of at least one projection normalizing coefficient being substantially represented in proportion to the square of a respective slope-handling coefficient, said slope-handling coefficient being characterized as inversely proportional to a root of the absolute value of at least one derivative of change in the local measure of said determined variable, said change being considered with respect to corresponding change in the respective measure of at least one considered orthogonal variable, the ratio of said change to said corresponding change being substantially represented in correspondence with said approximating relationship, and said slope-handling coefficient being determined at coordinates which substantially correspond to at least two considered elements of a respective inversion-conforming data set.

13. A data processing system as in claim 12 comprising means for generating at least one weighting coefficient, said effectuating including generating said at least one weighting coefficient, said weighting coefficient being substantially rendered directly proportional to the square of said respective slope-handling coefficient and inversely proportional to an estimated variability, said estimated variability substantially representing possible variations in said correspondingly determined variable measure as related to a representation of uncertainty in the sampling of at least one element of said respective subset of data-point coordinates, and said representation of uncertainty being considered to characterize variations in possible outcomes of acquisition sampling of a form corresponding to the sampling used in acquiring the respective coordinate sample for said at least one element.

14. A data processing system as in claim 12 comprising means for generating at least one correction to a considered data inversion, said correction being rendered in correspondence with said considered data inversion and successive simulations of data, said effectuating including generating said at least one correction, and said at least one data representation including said correction;

said correction being generated by:

representing an initial estimate of said correction in correspondence with a respectively considered approximating relationship of corresponding parametric approximative form, rendering said simulations by combining successive estimates of said correction with a characteristic representation of error deviations, rendering inversions of said successive simulations by implementing similar processing techniques for successively processing said simulations that were used in processing to generate said considered data inversion, rendering said successive estimates of said correction by combining prior said estimates with said considered data inversion and with respective inversions of said successive simulations, and implementing and effecting at least some form of successive estimate approximating and thereby rendering inversions of said successive simulations to more closely replicate said considered data inversion.

15. A weighting coefficient generator comprising means for generating a representation of at least one weighting coefficient, said weighting coefficient being rendered as substantially related to inverse proportion of the estimated variability of a parametrically determined variable measure, said parametrically determined variable measure being restricted to the confines of an approximating relationship, said approximating relationship being established in correspondence with a parametric approximative form and at least one parameter estimate, said at least one parameter estimate being generated in correspondence with a plurality of approximation-conforming data sets, each of said approximation-conforming data sets comprising a corresponding subset of respective data-point coordinates and at least one respectively determined variable measure, each said respectively determined variable measure being determined in correspondence with said approximating relationship and at least one data-point coordinate of the corresponding said subset, each said subset excluding a sample for the coordinate which corresponds to the respective said parametrically determined variable measure, said estimated variability riot being represented by the variance of a respectively considered data-point-sample acquisition for said variable, said estimated variability not being represented as an effective variance of a respectively considered data-point-sample acquisition for said variable, said estimated variability being represented in correspondence with possible variations in said parametrically determined variable measure, said possible variations being associated with uncertainty in at least one respective lateral component, said at least one respective lateral component being implemented to establish said parametrically determined variable measure as restricted to said confines, variability of said lateral component being related to considered variations in possible outcomes in the sampling acquisition of respective elements of corresponding subsets of data-point coordinates, said estimated variability substantially representing possible dispersions in said parametrically determined variable measure as related to represented uncertainty in the respectively considered sampling of at least one element of the corresponding said subset, said at least one element respectively corresponding to said lateral component, said dispersions being considered in correspondence with restraints imposed by said approximating relationship, and representation of said uncertainty being related to considered variations in possible outcomes of orthogonal component acquisition sampling of a form corresponding to the sampling used in acquiring the respective coordinate sample for said at least one element;

said means for generating including:

a control system, means for accessing, processing, and representing information, and said control system being configured for providing said accessing, processing, and representing information;

said processing including:

accessing provided data, representing said estimated variability in correspondence with said approximating relationship, and rendering said weighting coefficient in correspondence with the inverse of said estimated variability.

16. A weighting coefficient generator as in claim 15 wherein said at least one weighting coefficient is substantially rendered in direct proportion to the square of a projection normalizing coefficient, said projection normalizing coefficient being substantially represented in proportion to a respective slope-handling coefficient, said slope-handling coefficient being characterized as inversely proportional to a root of the absolute value of at least one derivative of change in the local measure of said parametrically determined variable, said change being considered with respect to corresponding change in the respective measure of at least one considered orthogonal variable, the ratio of said change to said corresponding change being substantially represented in correspondence with said approximating relationship, and said slope-handling coefficient being determined at coordinates which substantially correspond to at least two considered elements of a respective approximation-conforming data set.

17. A weighting coefficient generator as in claim 15 wherein said representing information includes:

representing at least one other estimate of variability in correspondence with said approximating relationship, said at least one other estimate of variability substantially representing possible variations in a determined measure of at least one other variable as related to respectively considered variations in at least one element of an alternate subset of data-point coordinates, said at least one other estimate of variability not being represented by the variance of a respectively considered data-point-sample acquisition for said at least one other variable, said at least one other estimate of variability not being represented as an effective variance of a respectively considered data-point-sample acquisition for said at least one other variable, said determined measure of said at least one other variable being restricted to said confines, possible variations in said determined measure being associated with uncertainty in at least one alternate lateral component, said at least one alternate lateral component being implemented to establish said determined measure as restricted to said confines, representation of the uncertainty in said alternate lateral component being related to variations in possible outcomes in the sampling acquisition of at least one element of said alternate subset, said alternate subset excluding a respective sample for the coordinate which corresponds to said at least one other variable, and said approximating relationship establishing respective correspondence between parametrically determined measure of said at least one other variable and at least one element of said alternate subset;

said processing including:

generating at least one other weighting coefficient in correspondence with the inverse of said at least one other estimate of variability, rendering said at least one weighting coefficient and said at least one other weighting coefficient in proportion to corresponding squares of respective slope-handling coefficients, said at least one weighting coefficient being substantially represented as inversely proportional to the square of a root of the absolute value of at least one derivative of change in the measure of said parametrically determined variable, said at least one derivative of change in the measure of said parametrically determined variable being considered with respect to a corresponding change in the measure of said at least one other variable, said at least one other weighting coefficient being substantially represented as inversely proportional to the square of a root of the absolute value of at least one derivative of change in the determined measure of said at least one other variable, said at least one derivative of change in the determined measure of said at least one other variable being considered with respect to a corresponding change in the measure of said parametrically determined variable, each said derivative of change being related to the locus of conforming points along respective confines of said approximating relationship, each said derivative of change being evaluated in correspondence with at least two respective coordinates, and said respective coordinates substantially corresponding to considered elements of respective approximation-conforming data sets.

18. An output product comprising a data representation generated by a data processing system, and said data representation being rendered in correspondence with at least one data inversion;

said data representation comprising: processed information, and said processed information establishing a descriptive correspondence of a determined parametric approximative form;

said output product being generated by:

activating means for accessing, processing, and representing information whereby at least one form of inversion-conforming data sets processing is effectuated, accessing provided data, effectuating said at least one form of inversion-conforming data sets processing, and rendering said data representation in correspondence with said effectuating;

said effectuating including:

implementing and effecting at least one form of parameter estimating in correspondence with said provided data whereby at least one inversion parameter estimate is generated, said at least one inversion parameter estimate being generated in correspondence with a plurality of data-point projections and said parametric approximative form, each of said data-point projections extending from respective data-point coordinates to intersect an approximating relationship, said approximating relationship being determined in correspondence with said parametric approximative form and at least one parameter estimate, intersections of said data-point projections with said approximating relationship substantially establishing respective inversion-conforming data sets which comprise projected coordinates for points that conform to a respective data inversion at said intersections, each of said sets of projected coordinates comprising a subset of said respective data-point coordinates and at least one correspondingly determined variable measure, each said determined variable measure being determined in correspondence with said approximating relationship and at least one data-point coordinate of said respective subset, and said approximating relationship establishing respective correspondence between said at least one data-point coordinate and said at least one correspondingly determined variable measure;

said data processing system comprising:

said means for accessing, processing, and representing information, and means for specifying and providing said effectuating;

said means for accessing, processing, and representing information comprising:

a control system, and said control system being configured for providing said activating, said effectuating, and said representing information.

19. An output product as in claim 18 comprising a memory for storing data for access by an application program being executed on a processing system, said data representation being stored in said memory.

20. An output product as in claim 18 comprising at least one correction to a considered data inversion, said activating including activating means for generating said correction to said considered data inversion, and said rendering including said generating;

said effectuating including:

said generating, and summing at least some addends together in correspondence with each of at least two variable degrees of freedom, said at least some addends being generated in respective correspondence with a plurality of approximation-conforming data sets, at least two of said plurality of approximation-conforming data sets substantially representing respective intersections of at least two mutually orthogonal data-point projections with said approximating relationship in correspondence with said provided data and said at least two variable degrees of freedom, said correction being generated in correspondence with said considered data inversion and successive simulations of data, and said processed information comprising said correction;

said correction being generated by:

representing an initial estimate of said correction in correspondence with a respectively considered approximating relationship of corresponding parametric approximative form, rendering said simulations by combining successive estimates of said correction with a characteristic representation of error deviations, rendering inversions of said successive simulations by implementing similar processing techniques for successively processing said simulations that were used in processing to generate said considered data inversion, rendering said successive estimates of said correction by combining prior said estimates with said considered data inversion and with respective inversions of said successive simulations, and implementing and effecting at least some form of successive estimate approximating and thereby rendering inversions of said successive simulations to more closely replicate said considered data inversion.

21. An output product as in claim 18 wherein said effectuating includes rendering representation of the square of at least one projection normalizing coefficient and summing at least some addends together in correspondence with each of at least two variable degrees of freedom, said at least some addends being generated in respective correspondence with a plurality of approximation-conforming data sets, at least two of said plurality of approximation-conforming data sets substantially representing respective intersections of at least two mutually orthogonal data-point projections with said approximating relationship in correspondence with said provided data and said at least two variable degrees of freedom, said square of at least one projection normalizing coefficient being substantially represented in proportion to the square of a respective slope-handling coefficient, said slope-handling coefficient being characterized as inversely proportional to a root of the absolute value of at least one derivative of change in the local measure of said determined variable, said change being considered with respect to corresponding change in the respective measure of at least one considered orthogonal variable, the ratio of said change to said corresponding change being substantially represented in correspondence with said approximating relationship, and said slope-handling coefficient being determined at coordinates which substantially correspond to at least two considered elements of a respective inversion-conforming data set.

22. An output product as in claim 21 wherein said effectuating includes representing an estimated variability, said estimated variability substantially representing possible variations in said determined variable measure as related to a representation of uncertainty in the sampling of at least one element of said respective subset of data-point coordinates, and said representation of uncertainty being considered to characterize variations in possible outcomes of acquisition sampling of a form corresponding to the sampling used in acquiring the respective coordinate sample for said at least one element.

23. A method for rendering a data representation of at least one correction to a considered data inversion of a determined parametric approximative form, said correction being rendered in correspondence with said considered data inversion and successive simulations of data, said correction being generated by:

representing an initial estimate of said correction in correspondence with a respectively considered approximating relationship of corresponding parametric approximative form, rendering said simulations by combining successive estimates of said correction with a characteristic representation of error deviations, rendering inversions of said successive simulations by implementing similar processing techniques for successively processing said simulations that were used in the processing of data to generate said considered data inversion, rendering said successive estimates of said correction by combining prior said estimates with said considered data inversion and with respective inversions of said successive simulations, and implementing and effecting at least some form of successive estimate approximating and thereby rendering inversions of said successive simulations to more closely replicate said considered data inversion;

said method comprising:

activating means for accessing, processing, and representing information whereby said data representation is rendered, accessing provided data, effectuating at least one form of parameter estimating in correspondence with said provided data whereby said correction is generated, and including said correction in the rendering of said data representation;

said means for accessing, processing, and representing information comprising:

a control system, said control system being configured for providing said activating, said effectuating, and said representing information; and said method excluding rendering characteristic form iterations by a data processing system configured for implementing at least one form of inverse deviation variation weighting for representing the weight of respective function related deviations.

* * * * *